(12) United States Patent
Bringewatt et al.

(10) Patent No.: US 11,339,526 B2
(45) Date of Patent: May 24, 2022

(54) METHOD FOR FEEDING PIECES OF LAUNDRY TO A LAUNDRY SUBSEQUENT HANDLING APPARATUS AND DEVICE

(71) Applicant: Herbert Kannegiesser GmbH, Vlotho (DE)

(72) Inventors: Wilhelm Bringewatt, Porta Westfalica (DE); Jürgen Sielermann, Heubach (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 16/300,974

(22) PCT Filed: May 4, 2017

(86) PCT No.: PCT/EP2017/000555
§ 371 (c)(1),
(2) Date: Nov. 13, 2018

(87) PCT Pub. No.: WO2017/207083
PCT Pub. Date: Dec. 7, 2017

(65) Prior Publication Data
US 2019/0345664 A1    Nov. 14, 2019

(30) Foreign Application Priority Data

Oct. 14, 2016   (DE) .......................... 102016012274.9

(51) Int. Cl.
*D06F 67/04*      (2006.01)
*B65G 47/74*      (2006.01)
(Continued)

(52) U.S. Cl.
CPC ............. *D06F 67/04* (2013.01); *B65G 47/74* (2013.01); *D06F 89/02* (2013.01); *D06F 95/00* (2013.01); *B65G 2201/0229* (2013.01)

(58) Field of Classification Search
CPC .......... D06F 67/04; D06F 89/02; D06F 95/00; B65G 47/74; B65G 2201/0229
(Continued)

(56) References Cited

U.S. PATENT DOCUMENTS 4,437,247 A * 3/1984 Wiebesiek .............. D06F 67/04
                                                         38/143
5,168,645 A * 12/1992 Robin ..................... D06F 95/00
                                                         38/143
(Continued)

FOREIGN PATENT DOCUMENTS

CN    1233760 A    11/1999
EP    0372320 A2   6/1990
(Continued)

OTHER PUBLICATIONS

WIPO, International Search Report (on priority application), dated Jul. 18, 2017.
(Continued)

*Primary Examiner* — Lynn E Schwenning
(74) *Attorney, Agent, or Firm* — Laurence P. Colton; Smith Tempel Blaha LLC

(57) ABSTRACT

A method and device for supporting the isolating of pieces of laundry from a pile of laundry by means of an imaging apparatus. A further imaging apparatus serves for raising a front edge region of the piece of laundry onto the feed conveyor in an aligned manner. Furthermore, the gripping of corners or also edges, in particular the alignment thereof, can be detected by means of an imaging apparatus. The gripping and aligning of the pieces of laundry can be controlled or regulated by way of the positions and edge contours of the same which are determined by the imaging apparatuses. As a result, reliable, fully automated isolating of pieces of laundry and/or fully automated, targeted feeding (Continued)

of pieces of laundry to a folding machine or another such laundry subsequent handling apparatus is ensured.

27 Claims, 13 Drawing Sheets

(51) Int. Cl.
*D06F 89/02* (2006.01)
*D06F 95/00* (2006.01)

(58) Field of Classification Search
USPC .......................................................... 414/13
See application file for complete search history.

(56) References Cited

U.S. PATENT DOCUMENTS

| | | | | |
|---|---|---|---|---|
| 6,287,066 | B1* | 9/2001 | Heinz | D06F 95/00 198/455 |
| 6,826,856 | B1 | 12/2004 | McCabe | |
| 7,555,857 | B2* | 7/2009 | McCabe | D06F 67/04 38/143 |
| 7,641,040 | B2* | 1/2010 | Harris | B65G 47/1471 198/396 |
| 8,720,327 | B2* | 5/2014 | Eaves | D06F 95/00 100/35 |
| 8,732,995 | B2* | 5/2014 | Herzog | D06F 67/04 38/143 |
| 8,821,097 | B2* | 9/2014 | Page | D06F 95/00 414/13 |
| 9,988,220 | B2* | 6/2018 | Sielermann | B65G 47/90 |
| 2011/0142576 | A1* | 6/2011 | Herzog | D06F 67/04 414/222.01 |
| 2016/0144407 | A1 | 5/2016 | Sielermann | |
| 2016/0145055 | A1* | 5/2016 | Sielermann | B65G 47/90 414/751.1 |

FOREIGN PATENT DOCUMENTS

| | | |
|---|---|---|
| EP | 0879914 A1 | 11/1998 |
| EP | 2336420 A2 | 6/2011 |
| EP | 2444544 A2 | 4/2012 |
| EP | 2930264 A1 | 10/2015 |
| JP | 2008125901 A | 6/2008 |
| JP | 2010273732 A | 12/2010 |
| WO | 2016067163 A1 | 5/2016 |

OTHER PUBLICATIONS

Japan Patent Office, Office Action (for priority application, translated into German), dated Feb. 28, 2020.
China National Intellectual Property Administration, Notification of First Office Action (in a related application), dated Jul. 20, 2020.

* cited by examiner

METHOD FOR FEEDING PIECES OF LAUNDRY TO A LAUNDRY SUBSEQUENT HANDLING APPARATUS AND DEVICE

CROSS REFERENCE TO RELATED APPLICATIONS

This patent application claims the benefit of and is the US National Phase filing of International Application No. PCT/EP2017/000555 having an international filing date of 4 May 2017, which claims the benefit of and priority on German Patent Application No. 10 2016 006 413.7 having a filing date of 31 May 2016 and German Patent Application No. 10 2016 012 274.9 having a filing date of 14 Oct. 2016.

BACKGROUND OF THE INVENTION

Technical Field

The invention relates to a method for feeding pieces of laundry to a laundry subsequent handling apparatus, in particular a mangle or a folding machine, wherein at least one single piece of laundry is removed from a pile of laundry and the piece of laundry, aligned at least with part of an edge, is raised or deposited onto a feed conveyor of the or upstream of the laundry subsequent handling apparatus.

In addition, the invention relates to a device for isolating pieces of laundry to be fed from a laundry subsequent handling apparatus, preferably a mangle or a folding machine, having a conveyor for conveying a pile of laundry of multiple pieces of laundry to an isolating apparatus and at least one clamp following the isolating apparatus for raising preferably an edge strip of the piece of laundry, which proceeds from a front edge of the isolated piece of laundry, onto a feed conveyor of the or upstream of the laundry subsequent handling apparatus.

In addition, the invention relates to a device for feeding pieces of laundry to a laundry subsequent handling apparatus, preferably a mangle or a folding machine, having clamps for raising at least one edge strip of the piece of laundry, which proceeds from a front edge of the piece of laundry, onto a feed conveyor of the laundry subsequent handling apparatus.

In addition, the invention relates to a device for feeding pieces of laundry to a laundry subsequent handling apparatus, preferably a mangle or a folding machine, having a clamp for raising at least one edge strip of the piece of laundry onto at least one conveyor of the or upstream of the laundry subsequent handling apparatus.

Prior Art

Pieces of laundry to be fed to a laundry subsequent handling apparatus, for example a mangle or a folding machine, are as a rule removed from a pile of laundry. To this end, the pieces of laundry have first of all to be isolated. The isolated pieces of laundry are then fed to a feed conveyor of the laundry subsequent handling apparatus or upstream of the laundry subsequent handling apparatus. This occurs, for example, as a result of raising a front edge strip of the respective piece of laundry onto the feed conveyor in a transverse manner.

Various methods and devices for isolating pieces of laundry and/or for feeding pieces of laundry to a laundry subsequent handling apparatus are known. The determining of the most favorable point for gripping the pieces of laundry for isolating and for feeding the same to a laundry subsequent handling apparatus has proved to be a problem here. Predominantly, the known methods and devices only allow for partial automation of the isolating and/or of the feeding of the pieces of laundry.

BRIEF SUMMARY OF THE INVENTION

The object underlying the invention is to create a method and devices which allow for reliable, fully automated isolating and/or feeding of pieces of laundry to a laundry subsequent handling apparatus.

A method for achieving the object comprises a method for feeding pieces of laundry to a laundry subsequent handling apparatus, in particular to a mangle or a folding machine, wherein at least one single piece of laundry is removed from a pile of laundry and the piece of laundry, aligned at least with part of an edge, is raised or deposited onto a feed conveyor of the or upstream of the laundry subsequent handling apparatus, characterized in that the most favorable point to grip a piece of laundry is determined by at least one imaging apparatus and the piece of laundry is gripped at said point and pulled out of the pile of laundry, in that supported by at least one imaging apparatus at least part of an edge of the piece of laundry is clamped and said part of the edge of the piece of laundry is raised or deposited onto the feed conveyor supported by at least one imaging apparatus. It is accordingly provided to control the gripping preferably of one single piece of laundry from the pile of laundry by means of at least one imaging apparatus and furthermore to support the clamping of part of an edge of the isolated piece of laundry and the aligned raising and/or depositing of said piece of laundry onto the feed conveyor using at least one imaging apparatus. As a result, essential operations for feeding pieces of laundry to a laundry subsequent handling apparatus can be carried out in a reliable automated manner.

It is provided in a preferred manner to make the laundry edges and a gripper for gripping preferably one single piece of laundry from the pile of laundry movable relative to one another in three axes. It is provided to this end that the pile of laundry is able to be moved along one axis and the gripper along two axes. Said three axes in total preferably all intersect perpendicularly such that they are perpendicular to one another. As a result, relative movements between the gripper and the pile of laundry are possible along X, Y and Z axes of a three-dimensional system of coordinates or a three-dimensional space. The gripper, as a result of itself moving along two axes which are at right angles to one another and as a result of moving the pile of laundry along a third axis which extends at right angles to the two axes of the gripper, is able be moved to any arbitrary point of the pile of laundry, preferably to the point which has been determined by the imaging apparatus assigned to the isolating apparatus as a point that is particularly advantageous for gripping.

The imaging apparatus forwards the necessary data of said point to a control unit which then controls the drives for all three axes of the conveyor, carrying the pile of laundry, and of the gripper. For this purpose, the imaging apparatus can forward coordinates or a captured image, preferably a three-dimensional image, to the control unit, as a result of which the control unit determines the movement paths of the individual axes and controls the gripper and the conveyor in a corresponding manner.

According to an advantageous further development of the method, it is provided to feed the at least one piece of laundry removed from the pile of laundry to a re-isolating apparatus. In the event of multiple pieces of laundry being gripped at the same time, said pieces of laundry that have been gripped at the same time are separated in the re-isolating apparatus. This preferably occurs in such a manner that a rearmost point, in particular a rearmost corner, of the pieces of laundry that have been gripped together is detected. Said rearmost point belongs to one single piece of laundry which is then fixed at said rearmost point in the re-isolating apparatus such that the rest of the gripped pieces of laundry remain unfixed and preferably fall out of the re-isolating apparatus, for example back onto the pile of laundry. This ensures that with subsequent isolating possibly necessary, only one single piece of laundry actually remains and is then fixable at a defined point, in particular at an arbitrary corner. Said point or corner then forms a favorable prerequisite for the further feeding of the isolated piece of laundry to the laundry subsequent handling apparatus.

Another advantageous further development possibility of the method provides stretching the isolated pieces of laundry at two spaced-apart points, for example diagonally opposite corners. As a result, a corner which hangs down freely is realized on the stretched piece of laundry. Said corner is captured by at least one imaging apparatus. In particular, the position of the corner, which hangs down freely, of the piece of laundry stretched at spaced-apart points can also be determined in a reliable manner by the imaging apparatus.

It is provided, in particular, for the at least one imaging apparatus also to detect an edge of the piece of laundry or at least a part of the edge of the piece of laundry which proceeds from a corner which hangs down freely, in particular with regard to the alignment of at least part of said edge and where applicable also to the length of the edge.

The image captured by the at least one imaging apparatus and/or the image data can be used for the targeted moving and/or aligning of at least one clamp to the or toward the relevant corner and/or an edge proceeding from the corner or at least part thereof. The clamp can thus be controlled in a precise and automated manner in dependence on the data, in particular image data, captured and supplied by the imaging apparatus.

It is conceivable for the clamp to hold the detected edge of the piece of laundry at two spaced-apart points. The clamp then holds a stretched portion of the edge of the piece of laundry, preferably a part of an edge which proceeds from the previously detected corner of the piece of laundry which hangs down freely. By holding said part of the edge of the piece of laundry at two spaced-apart points, a stretched part of the edge of the piece of laundry is realized between said points. The clamp then holds as it were part of the edge of the piece of laundry in a stretched state. This ensures reliably targeted further handling of the piece of laundry, in particular transferring the piece of laundry to another clamp or raising or depositing it onto at least one conveyor, for example a feed conveyor. The other clamp can then grip the part of the relevant edge of the piece of laundry held stretched between two points such that the subsequent clamp also holds a stretched part of an edge of the piece of laundry, preferably a straight part of the edge of the piece of laundry. As a result, a spread-out edge region of the piece of laundry can be formed under the clamp, the part of the edge of the piece of laundry which is held in a stretched and/or straight manner by the other clamp, defining a side and/or the length of the edge strip.

According to another further development possibility of the method, it is provided that the piece of laundry is deposited and/or raised onto the feed conveyor from the side transversely to the feed and transport direction of said feed conveyor with the part of an edge that is held in a stretched manner by the clamp in the front. The edge strip is preferably deposited at the front onto the feed conveyor. In this case, a front edge of the piece of laundry, that is to say the edge which runs transversely to the transport direction of the feed conveyor, moves onto the feed conveyor.

A preferred design possibility of the method provides monitoring, by at least one apparatus, the raising of the piece of laundry, preferably of the edge strip of the same proceeding from the front edge, with regard to the right-angled alignment to the transport direction of the feed conveyor. In a preferred manner, the angle of the front edge of the piece of laundry with respect to the transport direction of the feed conveyor or to another such conveyor is captured by means of at least one imaging apparatus or a line sensor apparatus or an apparatus realized in the manner of a light strip. As a result, deviations from the desired right-angled contour of the front edge of the piece of laundry with respect to the feed direction can be recognized by the respective apparatus.

Each angular deviation recognized by the apparatus can be used for controlling an aligning apparatus. The aligning apparatus brings about the precise transverse alignment of the piece of laundry relative to the feed conveyor by way of the data determined by the apparatus or also by way of an image. Deviations in the direction of the front edge of the piece of laundry when feeding to the feed conveyor are corrected by the aligning apparatus in such a manner that once the front edge strip of the piece of laundry has been deposited onto the feed conveyor, the front edge of the piece of laundry extends at right angles to the feed and transport direction of the feed conveyor. Consequently, the method is designed for depositing the piece of laundry onto the feed conveyor in a precisely transverse manner in dependence on the data, preferably image data, determined by the at least one apparatus prior to depositing the piece of laundry on the feed conveyor.

A device for achieving the object named in the introduction is a device for isolating pieces of laundry to be fed from a laundry subsequent handling apparatus, preferably a mangle or a folding machine, having a conveyor for conveying a pile of laundry of multiple pieces of laundry to an isolating apparatus and at least one clamp following the isolating apparatus for raising preferably an edge strip of the piece of laundry, which proceeds from a front edge of the isolated piece of laundry, onto a feed conveyor of the or upstream of the laundry subsequent handling apparatus, characterized in that at least one imaging apparatus is assigned to the conveyor and to the isolating apparatus assigned to said conveyor, wherein a gripper of the isolating apparatus, which is realized for gripping a piece of laundry from the pile of laundry, is movable along two axes and the pile of laundry is movable by the conveyor along a third axis. It is accordingly provided to assign at least one imaging apparatus to the isolating apparatus and to a conveyor for transporting the pile of laundry with the pieces of laundry to the isolating apparatus. The isolating apparatus has a gripper for gripping preferably one single piece of laundry from the pile of laundry which is movable along two axes which preferably extend at right angles to one another. The conveyor forms a third axis which is aligned, once again at right angles, to the two axes of the gripper and along which the pile of laundry is movable by the conveyor. As a result, spatial, three-dimensional, relative movements are possible between the gripper and the pile of laundry, the gripper, itself, only needing to be movable in two axes in a plane, preferably an upright plane, which is intersected perpendicularly by the transport direction of the conveyor. The conveyor, which has to transport the pile of laundry in any event along an axis in the transport direction, takes over the third dimension of the three-dimensional relative movement between the gripper and the pile of laundry. This simplifies the device.

A possibility for the further development of the device consists in assigning a re-isolating apparatus to the isolating apparatus. The re-isolating apparatus serves subsequently isolating multiple pieces of laundry which have been gripped at the same time by the gripper of the isolating device. In this case, one of the pieces of laundry gripped at the same time is held back by the re-isolating apparatus, whilst the remaining pieces of laundry are ejected.

A further device for achieving the object named in the introduction, it also being able to be a preferred further development of the previously described device, is a device for feeding pieces of laundry to a laundry subsequent handling apparatus, preferably a mangle or a folding machine, having clamps for raising at least one edge strip of the piece of laundry, which proceeds from a front edge of the piece of laundry, onto a feed conveyor of the laundry subsequent handling apparatus, characterized in that the piece of laundry is stretchable in each case by a clamp at two spaced-apart points for realizing a corner of the piece of laundry which hangs down freely and at least one imaging apparatus is provided for determining at least the position of the corner of the piece of laundry which hangs down freely. Said device is realized for stretching the piece of laundry held at two spaced-apart and/or oppositely situated points, for example corners. This produces a corner of the piece of laundry which hangs down freely and is defined by two edges of the piece of laundry which proceed from opposite sides of said corner.

It is additionally provided in the case of said device to detect, by means of at least one imaging apparatus, the corner, which hangs down freely, of the piece of laundry held at two spaced-apart points and, as an alternative to this or at the same time, also to capture the image of at least one edge which proceeds from said corner which hangs down freely. As a result, targeted gripping of the piece of laundry at the edge which proceeds from the corner which hangs down freely, in particular a part of the edge adjoining the corner, can be effected for targeted further handling of the piece of laundry, in particular for the precisely aligned feeding and/or depositing of the piece of laundry onto the feed conveyor.

The free edge of the piece of laundry, detected by the at least one imaging apparatus, is preferably grasped by at least one clamp which, controlled by the at least one imaging apparatus, is aligned to the relevant edge and is moved toward said relevant edge. The aligning of the double clamp is preferably effected as a result of it being pivotable and/or rotatable, in particular in dependence on the alignment of the edge of the piece of laundry to be gripped which has been determined by the at least one imaging apparatus. As a result, the desired edge of the piece of laundry can be gripped reliably in a positionally accurate manner and/or aligned to the contour of the edge by the clamp.

The clamp for gripping the free edge of a region of the same detected by the at least one imaging apparatus is realized in a preferred manner as a double clamp with two adjacent clamping jaws. In the case of a particularly advantageously realized device, the clamping jaws of the double clamp, where required, are movable apart and together. Once the two clamping jaws have been moved apart, a defined, preferably outstretched part of the free edge of the piece of laundry is fixed between the clamping jaws by the double clamp and is held in an aligned manner in particular for transfer to a subsequent clamp.

A further device for achieving the object named in the introduction, it also being possible for it to be a preferred further development of one or both previously described devices, is a device for feeding pieces of laundry to a laundry subsequent handling apparatus, preferably a mangle or a folding machine, having a clamp for raising at least one edge strip of the piece of laundry onto at least one conveyor of the or upstream of the laundry subsequent handling apparatus, characterized in that a clamp which holds part of a lateral edge of the edge strip of the piece of laundry is provided and said clamp is movable from one side of the at least one conveyor transversely to the feed direction of the piece of laundry to the laundry subsequent handling apparatus over the at least one conveyor and/or is raisable onto the at least one conveyor. In the case of said device, a clamp is provided which holds an outstretched part of an edge of the piece of laundry. In a preferred manner, this is a lateral edge of the piece of laundry which adjoins a corner of the front edge of the piece of laundry. Said part of a lateral edge of the piece of laundry, which is held in a stretched manner and adjoins the front edge of the piece of laundry, is pulled away by the clamp transversely to the conveying direction of the feed conveyor above a conveyor which, where applicable, can be a feed conveyor. In this case, a laterally held edge strip, with the front edge of the piece of laundry leading, is raised or deposited transversely onto the feed conveyor or at least onto a separate conveyor assigned to or arranged upstream of said conveyor.

A preferred further development of the device provides at least one imaging apparatus which monitors the aligning of the piece of laundry, in particular of the front edge strip of the same, with respect to the feed conveyor. In particular, the angle of the front edge of the piece of laundry or of the front edge strip of the same with respect to the transport direction of the feed conveyor is monitored by the at least one apparatus. Said angle is to be 90°. Where there are deviations from this, an aligning apparatus is provided which is controlled in dependence on data from the at least one apparatus such that deviations from the right-angled contour of the front edge of the piece of laundry to the transport direction or longitudinal axis of the feed conveyor are balanced out and as a result are eliminated.

In a preferred manner, the aligning apparatus is provided with a guide roll or a guide roller which presses from above against the part of the edge strip of the piece of laundry already raised onto the feed conveyor and rolls off hereon. The piece of laundry is clamped as it were between the guide roll or guide roller and the feed conveyor located below the piece of laundry. The direction of the front edge strip is able to be corrected where necessary as a result of a corresponding change in direction of the guide roll or of the guide roller, in particular pivoting effected about a directional axis which extends transversely to the rotational axis of the roll or roller. The control of the guide roller or of the guide roll is effected, in this case, in dependence on the direction of the front edge strip of the piece of laundry received from the at least one apparatus during or prior to being placed onto the feed conveyor. In this way, the at least one apparatus with the aligning apparatus ensures that the piece of laundry, in particular the front edge strip of the same, is able to move onto the feed conveyor with the front edge aligned precisely at right angles to the feed direction or the longitudinal center axis of the feed conveyor, by the front edge of the piece of laundry extending as precisely as possible at 90° to the transport direction or the longitudinal center axis of the feed conveyor once the front edge strip of the piece of laundry has been fed to the feed conveyor.

BRIEF DESCRIPTION OF THE DRAWINGS

Preferred exemplary embodiments of the invention are explained in more detail below by way of the drawing, in which.

DETAILED DESCRIPTION OF PREFERRED EMBODIMENTS

The figures show a device according to the invention which serves for isolating and feeding a piece of laundry 20, which is shown in some figures, to a feed conveyor 21 upstream of a laundry subsequent handling apparatus (not shown), for example a folding machine or a mangle. In a preferred manner, the piece of laundry 20 is so-called flatwork, above all napkins, hand towels, table cloths, bed sheets, duvet covers or pillow covers. The device is also suitable, however, for isolating and feeding other pieces of laundry to a laundry subsequent handling apparatus. The feed conveyor 21 can be a component part of the device, but also of the laundry subsequent handling apparatus.

Figure 1:
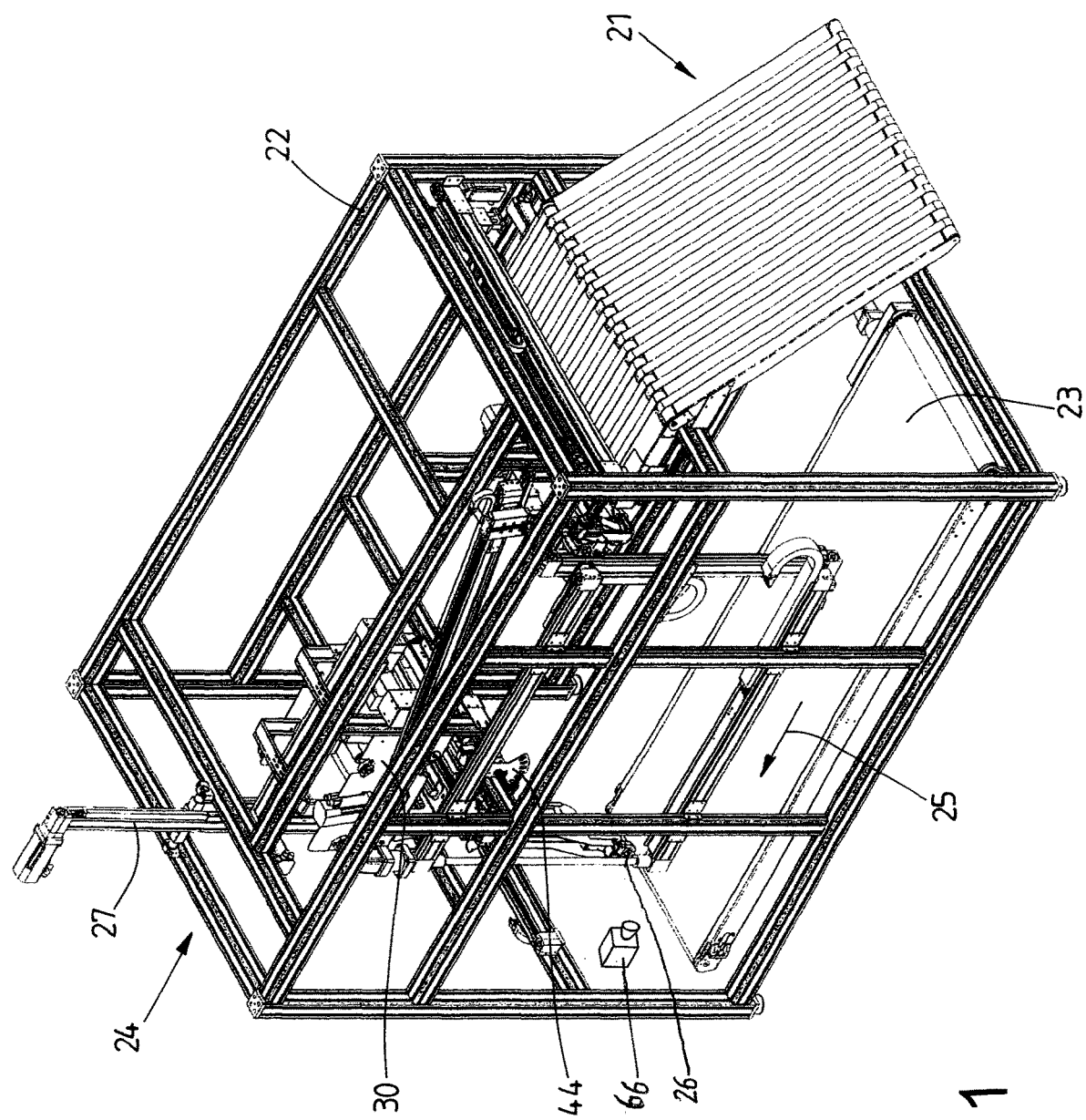
FIG. 1 shows a perspective representation of the device (without a cover)
Figure 2:
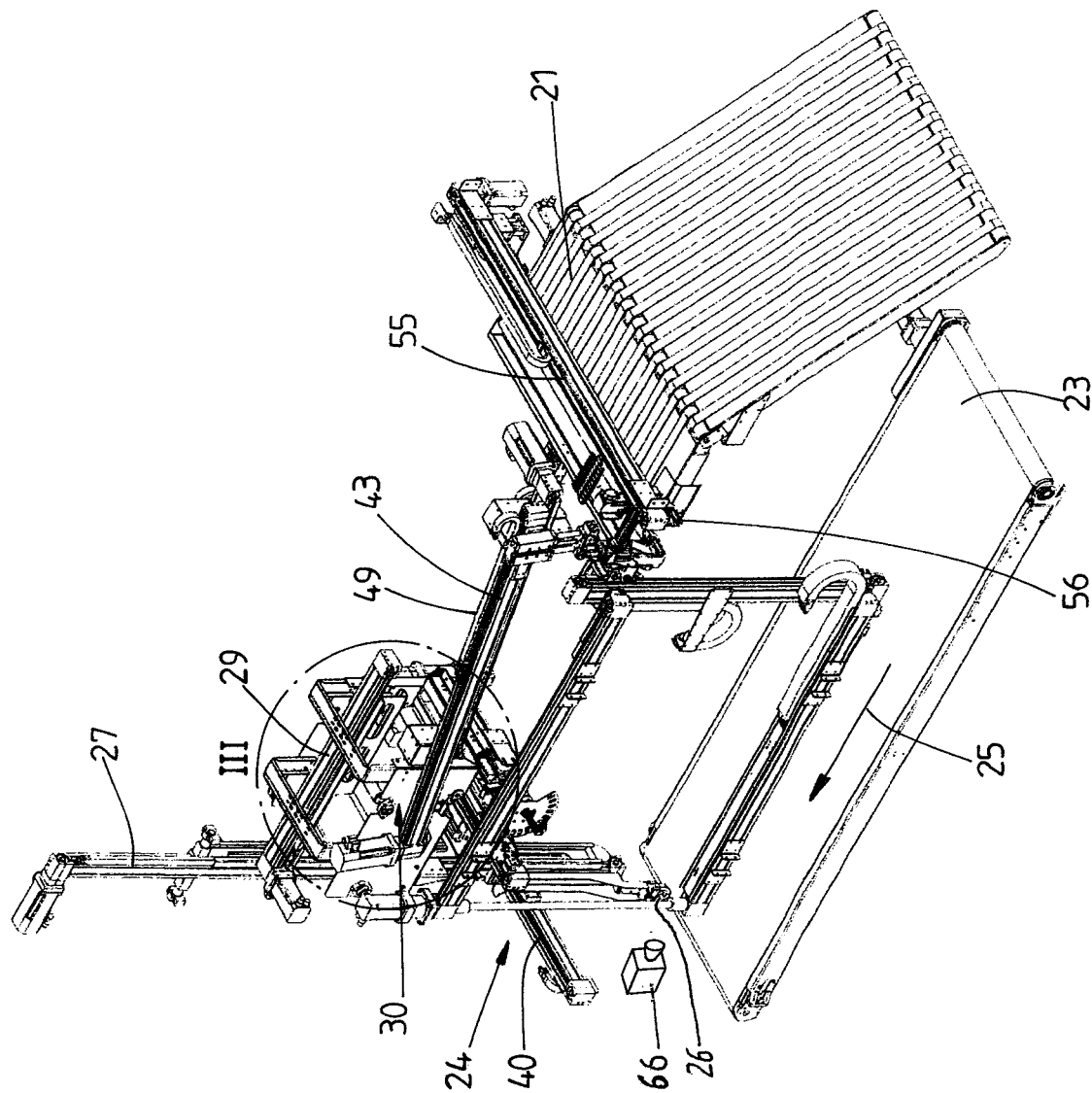
FIG. 2 shows a perspective representation of the device of FIG. 1 without a housing frame.

The device comprises a housing, only a frame 22 of which is shown in FIG. 1 but not the outer cover which is supported by the frame 22. For the purposes of clarity, the frame 22 is not shown in FIGS. 2, 9 and 13.

In the bottom region of the device, there is a preferably horizontal conveyor which is realized as a belt conveyor 23 in the exemplary embodiment shown. The belt conveyor 23 serves for transporting a pile of laundry, which is not shown in the figures and is produced from a plurality of pieces of laundry 20, to an isolating apparatus 24 of the device. For this purpose, the belt conveyor 23 is drivable in such a manner that an upper run of the same carrying the pile of washing is moved in the transport direction 25 to the isolating device 24.

The isolating apparatus 24 has a gripper 26 which ideally picks out one single piece of laundry 20 from the pile of laundry. The gripper 26 is movable up and down along a linear axis, preferably a shuttle cylinder 27. Furthermore, the gripper 26 is movable transversely to the movement path of the shuttle cylinder carrying it and also transversely to the transport direction 25 of the belt conveyor 23 or is pivotable about a rotational axis which is arranged at its upper end region and extends parallel to the transport direction 25. As a result, the gripper 26 can be moved along two axes in a plane which extends perpendicularly to the transport direction 25 of the belt conveyor 23. The transport direction 25 is consequently the surface normal to the vertical plane which extends transversely to the belt conveyor 23 and in which the gripper 26 is movable up and down by the shuttle cylinder 27 and the gripper 26 is pivotable or movable laterally. As a result, the gripper 26 is movable in two axes. The third axis corresponds to the transport direction 25 of the belt conveyor 23. In this way, spatial, three-dimensional and tri-axial relative movements are possible between the gripper 26 and the pile of laundry on the belt conveyor 23, one axis of said spatial movement being formed by the corresponding drive of the belt conveyor 23 in or in opposition to the transport direction 25.

The isolating apparatus 24 with the belt conveyor 23 has assigned thereto at a suitable point at least one imaging apparatus 66, 67, 68. This can be multiple two-dimensional cameras 66, 67 arranged at different locations or also one single three-dimensional camera 68. It must be ensured that the respective imaging apparatus 66, 67, 68 is able to recognize the pile of laundry on the belt conveyor 23 in order thus to detect a favorable or most favorable point of the pile of laundry for the gripper 26 at which the gripper 26 is best able to grip, as far as possible, one single piece of laundry 20 and to remove it out of the pile of laundry. Said point detected by the imaging apparatus 66, 67, 68 is transmitted to a control unit of the isolating apparatus 24 and of the drive of the belt conveyor 23 which then moves the gripper 26 in a targeted manner to the most favorable position detected or determined by the imaging apparatus 66, 67, 68 for gripping one single piece of laundry. This occurs by moving the gripper 26 of the isolating apparatus 24, where applicable bi-axially, and moving the pile of laundry, where applicable uniaxially, by means of a corresponding drive of the belt conveyor 23.

Figure 3:
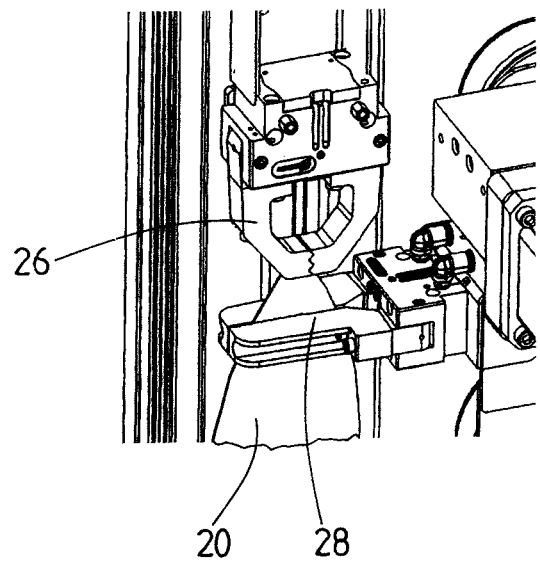
FIG. 3 shows a detail III from FIG. 2.
Figure 6:
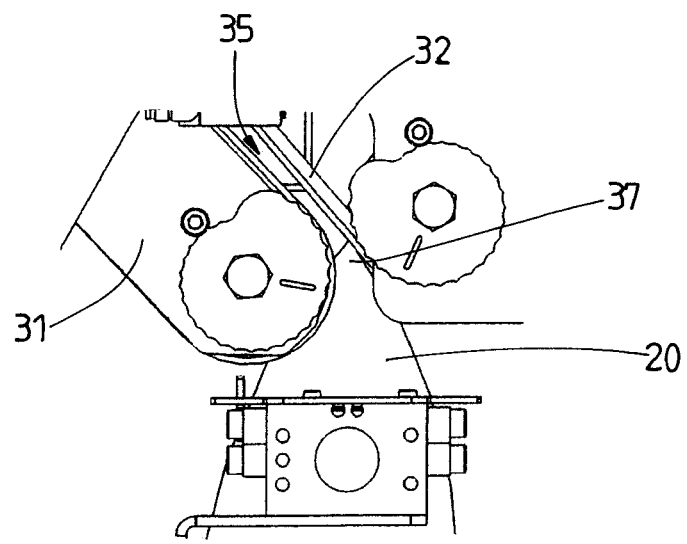
FIG. 6 shows a detail VI from FIG. 5.

The piece of laundry 20, gripped by the gripper 26 at the position determined by the imaging apparatus 66, 67, 68, is pulled upward out of the pile of laundry by moving the gripper 26 vertically from the shuttle cylinder 27. The piece of laundry 20, gripped by the gripper 26 at an arbitrary point, is then transferred to a clamp 28 (FIG. 3). To this end, the gripper 26 preferably moves the held point of the piece of laundry 20 through the open clamp 28. As soon as the gripper 26 with the gripped point has passed the open clamp 28, the clamp 28 is closed and, as a result, the piece of laundry 20 is situated gripped at a point which is in the vicinity, in particular adjacent, to the point gripped by the gripper 26. The gripper 26 is then opened and the piece of laundry is moved by the clamp 28 by a linear drive, preferably another shuttle cylinder 29, along a horizontal or a path slightly inclined to the horizontal in opposition to the transport direction 25 of the belt conveyor 23. As a result, the piece of laundry moves into an inlet region of a re-isolating apparatus 30.

Figure 4:
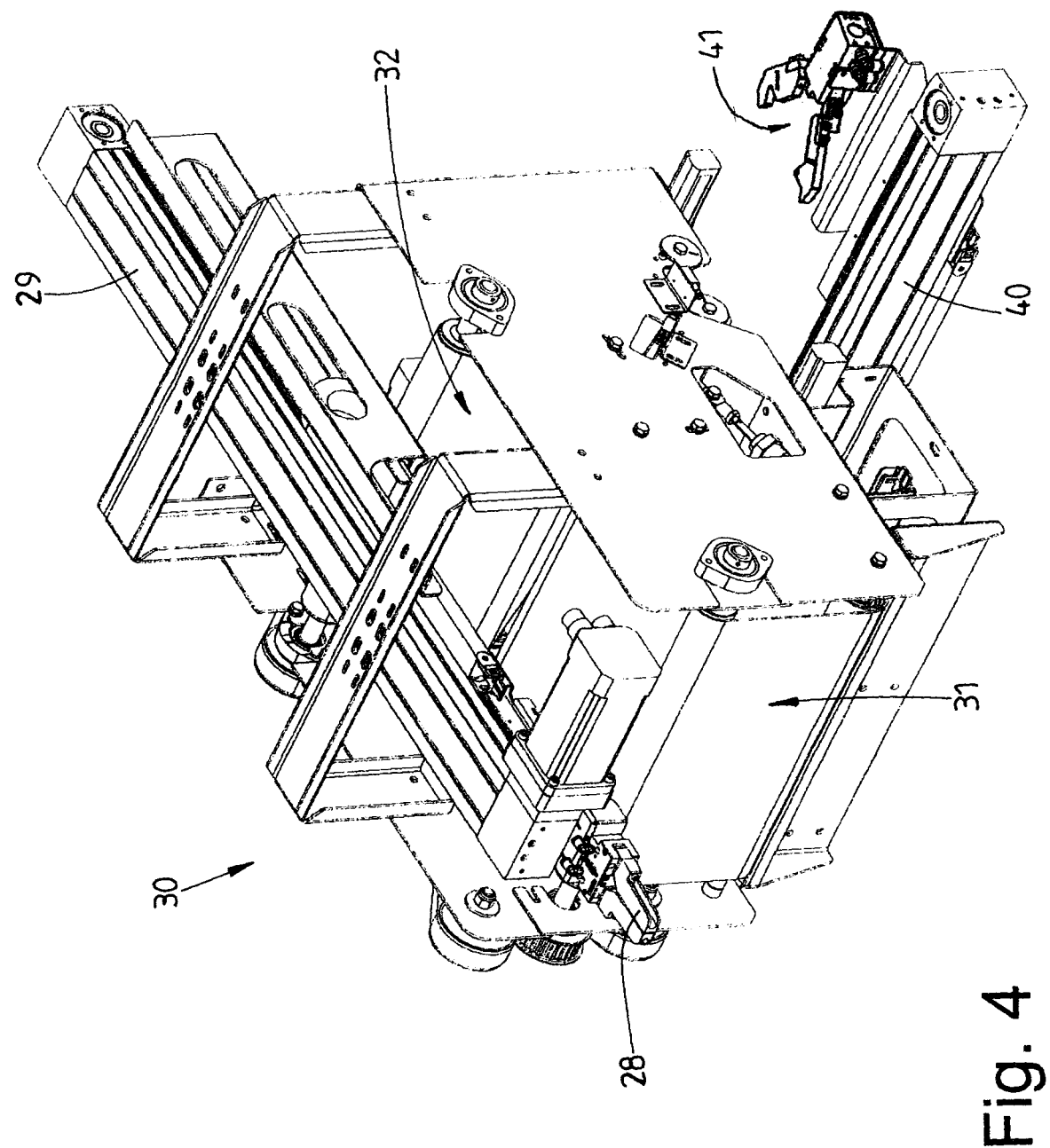
FIG. 4 shows a perspective view of a re-isolating apparatus.
Figure 5:
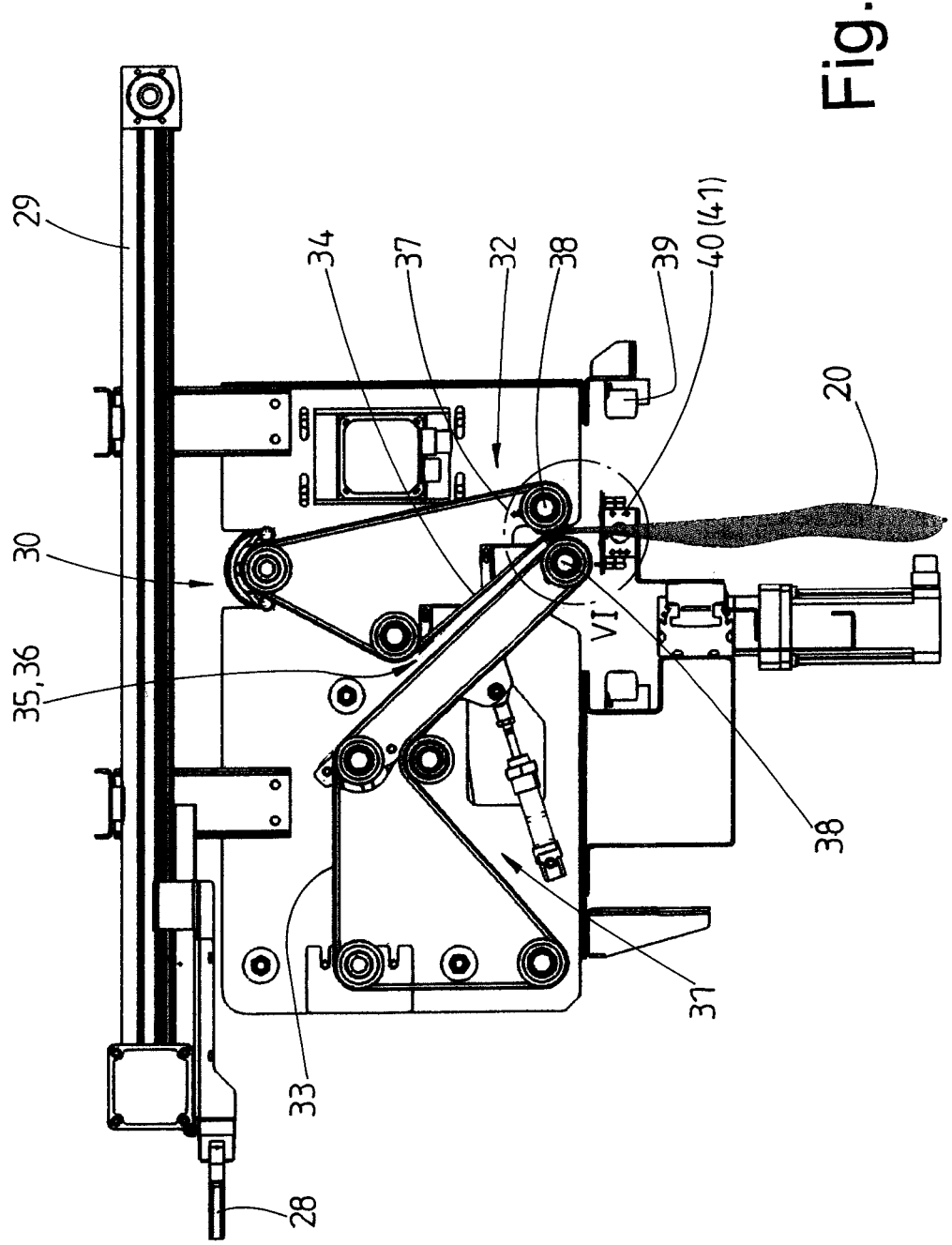
FIG. 5 shows a vertical longitudinal section through the re-isolating apparatus of FIG. 4.

The re-isolating apparatus 30 serves for the purpose of isolating possibly multiple, preferably two, pieces of laundry 20 gripped at the same time by the gripper 26. The re-isolating apparatus 30, clearly shown in FIGS. 4 and 5, has two separate belt drives 31, 32. An upper run 33 of the belt drive 31 begins prior to the belt drive 32. The upper run 33 of the belt drive 31 initially extends horizontally and then is directed sloping downward. The piece of laundry 20 is ejected onto preferably the horizontal front part of the upper run 33 of the belt drive 31 from the clamp 28 transported by the shuttle cylinder 29 in the direction of the re-isolating apparatus 30. The piece of laundry 20 is then forwarded by the belt drive 31 in the direction of the belt drive 32. The belt drive 32 has a run portion 34 which extends adjacent to the part of the upper run 33 of the belt drive 31 which is directed sloping downward and is somewhat shorter than said part of the upper run 33 of the belt drive 31 which is directed sloping downward. As a result, a gap 35 is created between the overlapping belt portions of the belt drives 31 and 32. According to the representation in FIG. 5, said gap 35 can be continuously reduced somewhat in the throughput direction of the piece of laundry 20 through the re-isolating apparatus 30. Both belt drives 31 and 32 are driven such that the portions thereof defining the gap 35 also run in the throughput direction 36, preferably at the identical speed.

Where multiple pieces of laundry 20 are gripped at the same time, a rearmost corner 37 of a piece of laundry 20 is realized at the latest at least in the gap 35 between the belt drives 31 and 32. The rearmost corner of the at least one piece of laundry 20 gripped at the same time is covered by said rearmost corner 37. The rearmost corner 37 of one of the pieces of laundry 20 gripped at the same time is detected by a sensor and other detecting means in the gap 35 shortly before the rear corner 37 of a single piece of laundry 20 has run through the rear end of the gap defined by two lower guide drums 38 of the belt drives 31 and 32. In said situation detected by the sensor or the like, both belt drives 31 and 32 are stopped. The rear corner 37 of a single piece of laundry 20 is then fixed or clamped at the end of the gap 35 between the guide drums 38, drive drums also being possible. If multiple pieces of laundry 20, which were ahead of the rear corner 37 of a piece of laundry 20 in the throughput direction 36 of the re-isolating apparatus 30, were to be gripped at the same time, said one piece of laundry 20 or where applicable also multiple pieces of laundry 20 would not be clamped at the rear end of the gap 35 such that they run through the gap 35 completely and drop down behind the re-isolating apparatus 30. Said at least one piece of laundry 20, as a result, moves back onto the lower belt conveyor 23 situated in the re-isolating apparatus 30 with the pile of laundry of still isolated pieces of laundry 20 and is thus returned again to the isolating apparatus 24.

A sensor is provided, preferably an elongated sensor strip or a light grid 39, behind and next to the gap 35 at the end of the re-isolating apparatus 30. Said light grid 39 detects the position of the piece of laundry 20, in particular the rear corner 37 of the same held at the end of the gap 35 between the guide drums 38. The light grid 39 controls a linear drive which is movable transversely to the transport direction 25 of the belt conveyor 23, in the exemplary embodiment shown a shuttle cylinder 40 which supports a transverse-grip clamp 41. The transverse-grip clamp 41 comprises two clamping jaws which are profiled on the clamping surfaces thereof which are directed toward one another and abut on opposite sides of the corner 37. One clamping jaw is preferably provided with a projection. The other clamping jaw comprises an indentation which corresponds with the projection (FIG. 1). As a result, a type of wedge is generated in the mouth of the clamp of the transverse-grip clamp 41. Said wedge snaps into the held corner 37, as a result of which a tip of the corner 37, which protrudes in relation to the clamp mouth of the transverse-grip clamp 41, is set up similarly to an ear. This facilitates the following gripping process.

Once the transverse-grip clamp 41 has gripped said rear corner 37, the transverse-grip clamp 41 is pulled sideways out of the re-isolating apparatus 30 by the shuttle cylinder 40 thereof transversely to the transport direction 25 of the belt conveyor 23. In this case, the outer tip of the rear corner 27 of the piece of laundry 20 held between the guide drums 38 of the belt drives 31 and 32 moves out of the region of the re-isolating apparatus 30, as a result of which the piece of laundry 20 is separated from the same.

Figure 7:
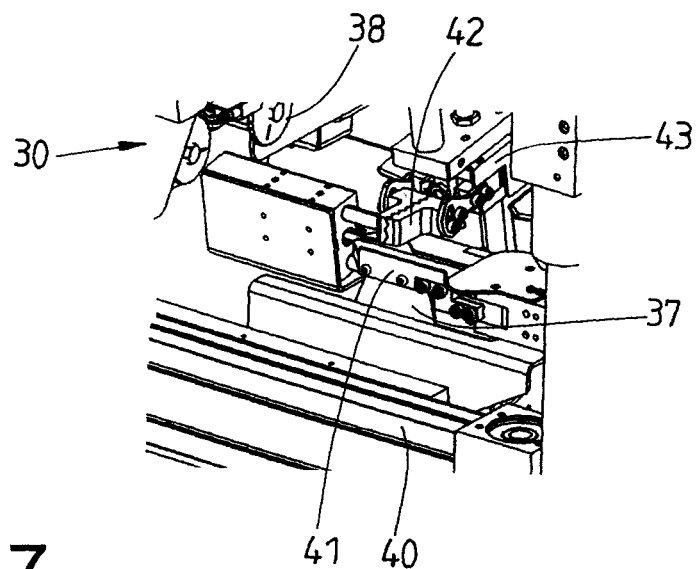
FIG. 7 shows a detail from FIG. 5.

After being pulled sideways out of the re-isolating apparatus 30, the piece of laundry 20, held with the corner 37 in the transverse-grip clamp 41, is transferred to a clamp 42. The clamp 42 captures the outer tip of the rear corner 37 of the piece of laundry 20, which has been pulled sideways out of the gap 35 of the re-isolating apparatus 30 beforehand by the transverse-grip clamp 41 (FIG. 7).

The clamp 42 holding the rear corner 37 of the piece of laundry 20 is moved along the direction of movement of a lightly ascending linear axis, in the exemplary embodiment shown once again a shuttle cylinder 43, parallel but in opposition to the transport direction 25 of the belt conveyor 23 in the direction of the feed conveyor 21. In this case, a part of the piece of laundry 20 which is hanging down is pulled by a tensioning apparatus 44 arranged below the shuttle cylinder 43.

The tensioning apparatus 44 can be formed from two parallel rolls or rollers, between which the part of the piece of laundry 20 hanging down is pulled through by the shuttle cylinder 43. The two rolls or rollers are movable together and apart in a tong-like manner. As a result, each roll is mounted on a pivot arm which is pivotable with the respective roll by a corresponding drive, for example a pneumatic cylinder. The rollers or rolls are movable together and apart in opposite directions independently of one another, in each case by means of an own cylinder. When the rolls are moved apart, that is to say, as it were, an open pair of rolls, the piece of laundry, with the clamp 42 of the shuttle cylinder 43 holding one region, in particular a corner, of the piece of laundry 20, is movable through the open pair of rolls. The rolls are then moved together such that the remaining part of the piece of laundry 20 can be pulled through the rolls of the pair of rolls which have been moved together. In order to make it easier for the rear part of the piece of laundry 20 to be pulled through the closed pair of rolls, it can be provided that at least one of the rolls is driven in a rotating manner. This occurs at a speed which is synchronized with the speed at which the shuttle cylinder 43 pulls the rear part of the piece of laundry 20 through the pair of rolls. As a result, the piece of laundry 20 is not subjected to any tension or not to any significant tension when the rear part of the same is pulled through the closed rolls of the pair of rolls. It is also conceivable for the drive speed of the driven roll of the pair of rolls to be set such that the pair of rolls holds the rear part of the piece of laundry 20 back somewhat such that it remains tensioned. As an alternative to this, it can be provided that initially the one roll of the pair of rolls is driven at such a speed that no tensile force is exerted onto the piece of laundry 20 when the rear part of the same moves through the pair of rolls and then when the clamp 42, moved by the shuttle cylinder 43, has reached its end position, the direction of rotation of the driven roll is reversed in the short term in order, in this way, to exert the desired tension on the piece of laundry 20 held between the pair of rolls of the tensioning apparatus 44 and the clamp 42.

Figure 8:
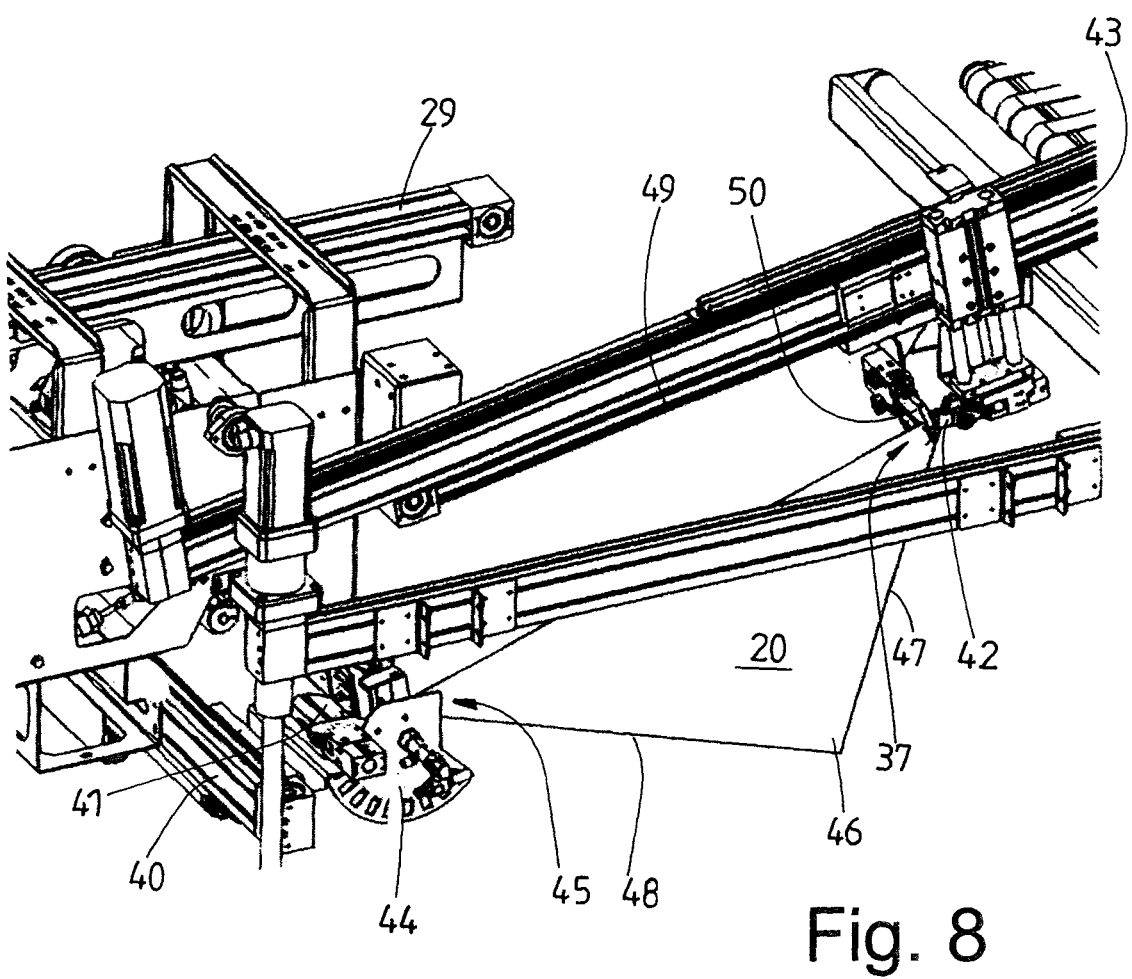
FIG. 8 shows a perspective representation of part of the device in the region of the stretching of a piece of laundry at diagonally opposite corners.

The tensioning apparatus 44 has assigned thereto at least one sensor which detects a rear end of the piece of laundry 20. This is a corner 45 which is located diagonally opposite the corner 37 held by the clamp 42 or a different point of the piece of laundry 20. Said corner 45 is caught by the tensioning apparatus 44 and is fixed or clamped by the same at the corner 45. By moving the clamp 42 further by means of the shuttle cylinder 43, a small piece of laundry 20, in the exemplary embodiment shown in FIG. 8, is tensioned between the diagonally opposite corners 37 and 45. A diagonal of the piece of laundry 20 then extends tightened between the clamp 42 and the tensioning device 44. A lower corner 46 is realized here by the tensioned diagonal of the piece of laundry 20. Said corner together with the diagonally opposite corners 37 and 45 of the piece of laundry 20 forms a triangle, the lowermost point of which is the corner 46. An edge 47 of the piece of laundry 20 is situated between the corners 46 and 37 and an edge 48 of the piece of laundry 20 is situated between the corners 46 and 45. The edge 47 is more inclined than the edge 48. As a rule, the edge 47 extends almost vertically and the edge 48 is only inclined somewhat to the vertical, proceeding from the tensioning device 44 sloping slightly downward in the direction of the lower corner 46. Depending on the length/width ratio of the piece of laundry 20, said edge 48 can extend horizontally or slightly ascending to the lower corner 46.

In the case of larger pieces of laundry 20, the clamp 42 would have to be moved relatively far, which means a longer movement path and would require a longer shuttle cylinder 43. Consequently, it is provided in the case of larger pieces of laundry 20 that they are not be tensioned between diagonally opposite corners 37 and 45 but between the corner 45 held by the tensioning device 44 and a point of the piece of laundry spaced apart from said corner. A triangle is also realized in this case, the lowermost point of which is the corner 46 of the piece of laundry 20.

Next to the shuttle cylinder 43 is situated a second parallel linear drive, preferably a further shuttle cylinder 49, with a clamp 50 which is movable back and forth by said linear drive. By encompassing it, the corner 37 of the piece of laundry 20 is taken over from said clamp 50 by the clamp 42 of the shuttle cylinder 43. As a result, the clamp 42 on the shuttle cylinder 43 becomes free to take over the corner 37 of a next piece of laundry 20 out of the re-isolating apparatus 30. The piece of laundry 20 is then held additionally between the tensioning device 44 and now the clamp 50 in a triangular configuration with corners 45 and 37 stretched diagonally and corner 46 hanging down freely for capturing a part region of the lower edge 48 of the piece of laundry 20 proceeding from the freely hanging corner 46 (FIG. 8).

A double clamp 51, with two clamping jaws 52 which are preferably realized in an identical manner, the distance between which is modifiable by a short shuttle cylinder 63, is situated a little below the clamp 50. The double clamp 51 has assigned thereto at least one imaging apparatus 66, 67, 68, at least one two-dimensional camera 66, 67 and preferably a three-dimensional camera 68. Said at least one imaging apparatus 66, 67, 68 serves for capturing the lower corner 46 and preferably at least one part of the lower edge 48 of the piece of laundry 20 proceeding from said lower corner. In a preferred manner, the at least one imaging apparatus 66, 67, 68 captures the position of the corner 46 and the direction of the edge 48 proceeding from said corner.

Figure 9:
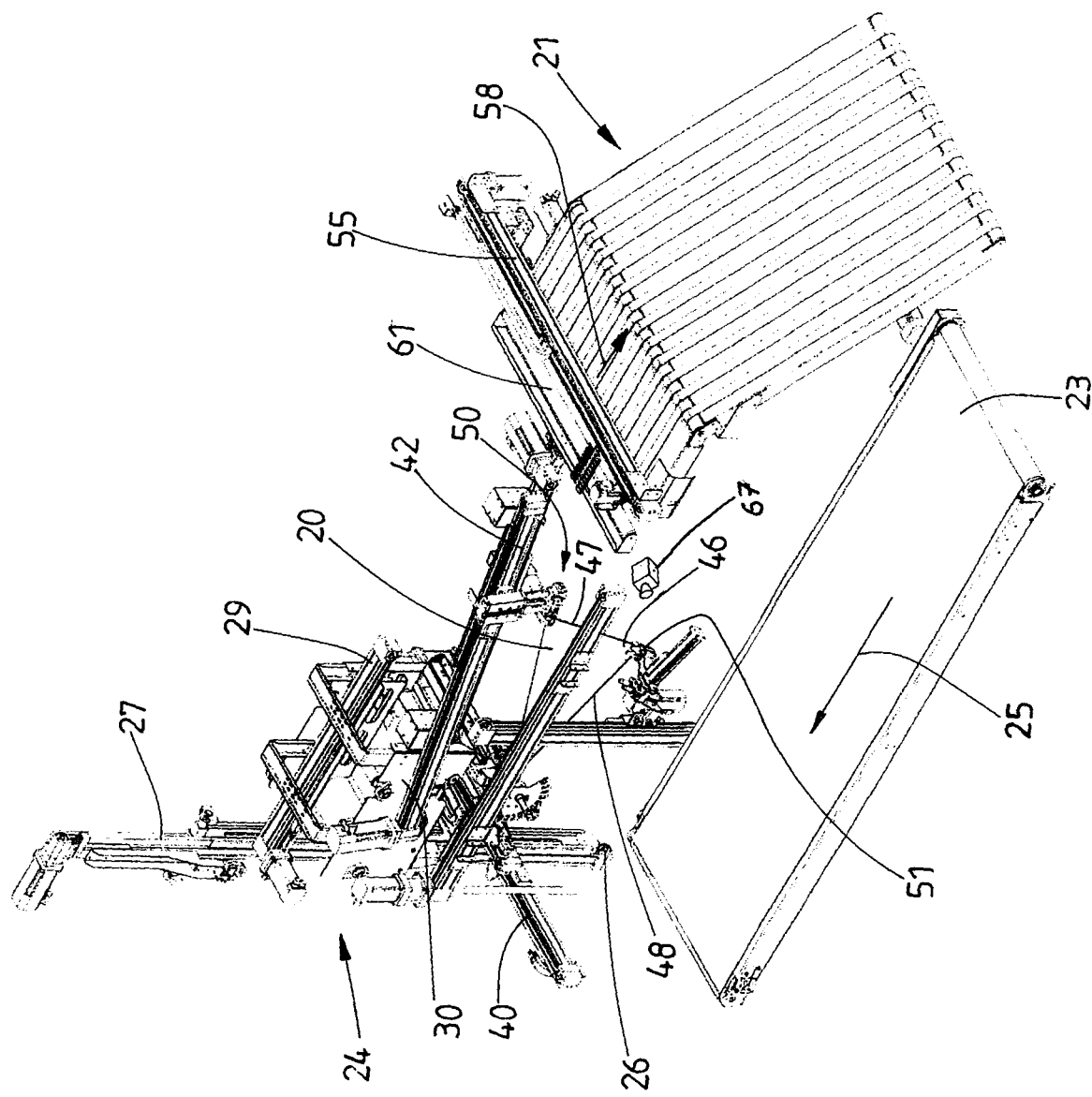
FIG. 9 shows a perspective view of the device analogous to FIG. 2 during the clamping of a corner region, which hangs down freely, of the piece of laundry which is situated in the state of FIG. 8.
Figure 10:
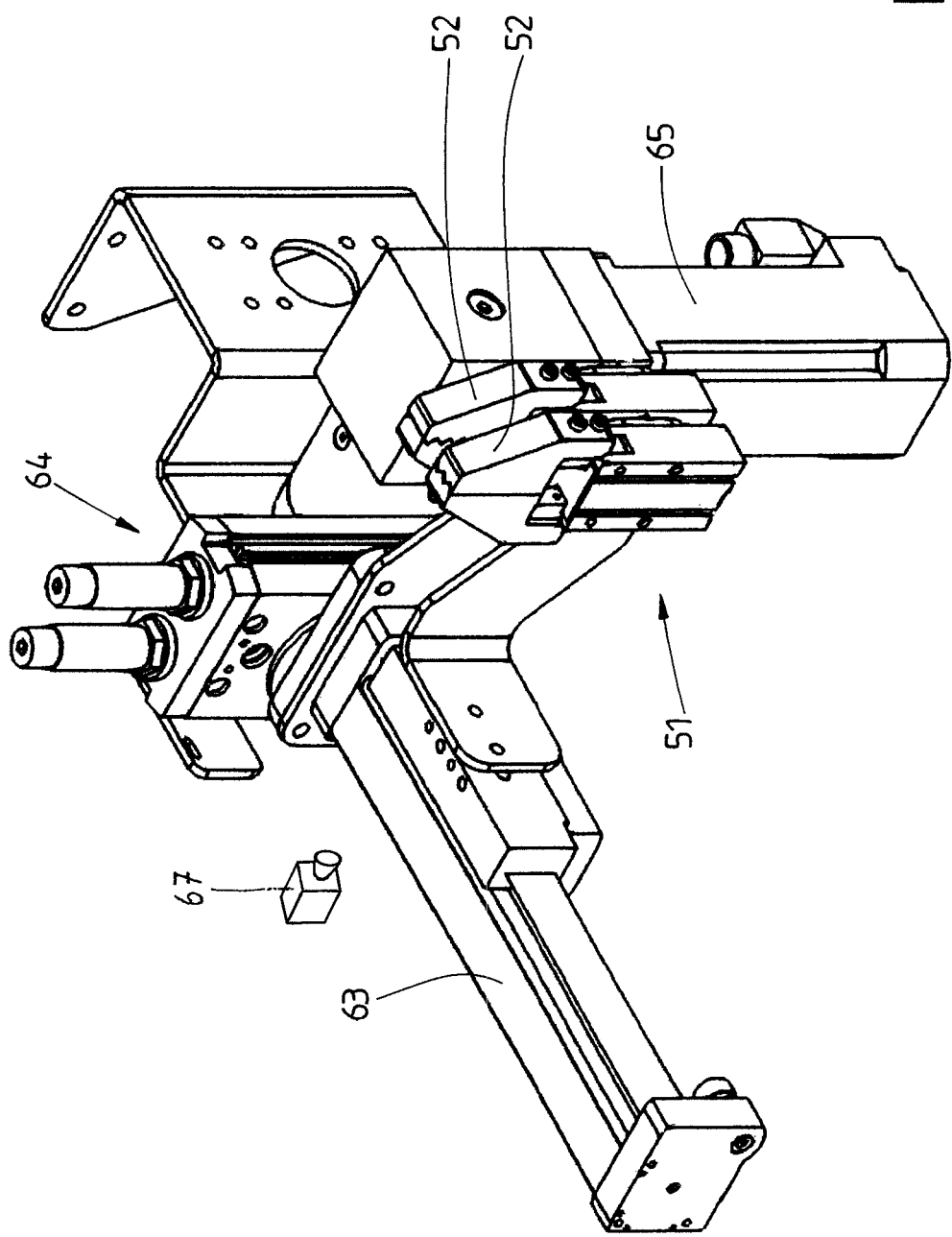
FIG. 10 shows a perspective representation of a double clamp of FIG. 9 in its starting position.
Figure 11:
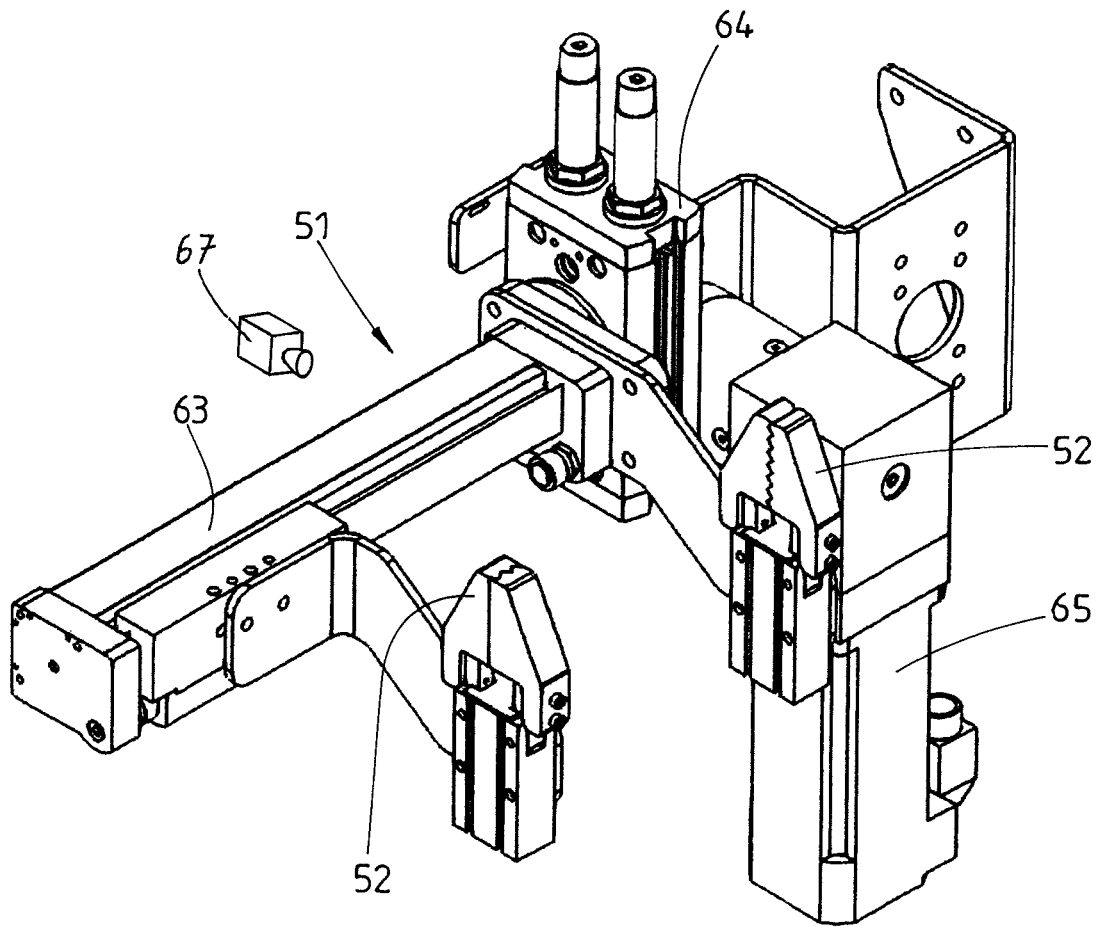
FIG. 11 shows the double clamp in a representation of FIG. 10 with the clamping jaws moved apart from one another.

The image data of the corner 46 and of the edge 48 captured by the at least one imaging apparatus 66, 67, 68 is transmitted to a control unit. Whereupon, said control unit aligns the double clamp 51, which is rotatable by a rotary drive 65 about a rotational axis transversely to the movement axis of the short shuttle cylinder 63, parallel to the edge 48. The double clamp 51 with upwardly pointing open clamping jaws 52 is then moved by the control unit by way of the data received from the at least one imaging apparatus 66, 67, 68 to an end region of the lower edge 48 of the piece of laundry 20 proceeding from the lower corner 46 (FIG. 9). The double clamp 51, in this case, is additionally rotated such that it is aligned parallel to the lower edge 48 of the piece of laundry 20 and the open ends of the clamping jaws 52 preferably point upward to the lower edge 48. In this case, the two clamping jaws 52 are moved together again as much as possible such that the distance between them is as small as possible (FIG. 10). The two clamping jaws 52 of the double clamp 51, in the closed point (FIG. 10), then grip an end region of the edge 48 proceeding from the lower corner 46 of the piece of laundry 20. The two clamping jaws 52 are designed such that the outer clamping jaw 52 of the double clamp 51, which is situated close to the lower corner 46, clamps the end region of the edge 48, proceeding from the corner 46, close to the corner 46. The inner second clamping jaw 52, which is located on the side of the outer, first clamping jaw 52 directed away from the corner 46, clamps the end region of the edge 48 of the piece of laundry 20 at a smaller clamping force. As a result, the second movable clamping jaw 52 of the double clamp 51 can slide along the short shuttle cylinder 63 parallel to the edge 48 along the same until the clamping jaws 52 have reached the maximum distance (FIG. 11). The second inner clamping jaw 52 is then also closed again, as far as the fixed outer first clamping jaw 52 on the corner 46. As a result of this, a narrow portion of the lower edge 48 of the piece of laundry 20 is spread out in a tightened manner by the two clamping jaws 52 of the double clamp 51 and is held in this state such that an almost straight part of the edge 48 is situated between the moved-apart clamping jaws 52 in the double clamp 51.

Figure 12:
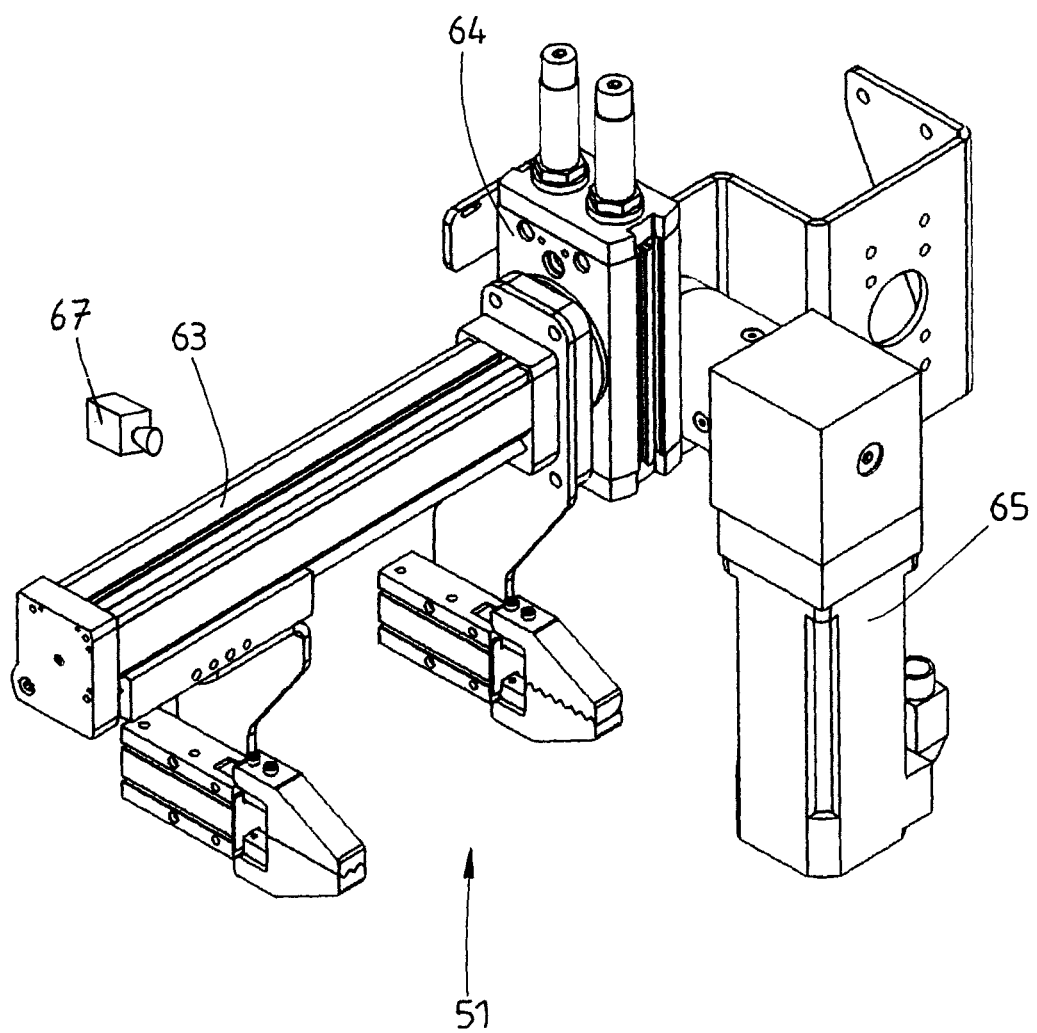
FIG. 12 shows the double clamp in a representation analogous to FIG. 11 with the clamping jaws pivoted to the side by 90°.

Both clamping jaws 52 in the double clamp 51 are then pivoted synchronously by means of a rotary drive 64 by 90° about a rotational axis which lies along the longitudinal axis of the short shuttle cylinder 63, in a clockwise manner with reference to the representation in FIGS. 11 and 12. The piece of laundry 20 then hangs down freely from the part of the edge 48 held stretched between the clamping jaws 52 in front of the tips of the clamping jaws 52. As a result of the part of the edge 48 of the piece of laundry 20 held stretched between the clamping jaws 52, an edge strip 53 of the piece of laundry 20 is realized under the tips of the clamping jaws 52. Because the outer, fixed clamping jaw 52 of the double clamp 51 pointing to the feed conveyor 21 holds the piece of laundry 20 tightly at its corner 46, the edge 47 of the piece of laundry 20 hanging down perpendicularly from said corner in the exemplary embodiment shown is the front edge 54 of the same.

Once the edge strip 53 of the piece of laundry 20 held by the double clamp 51 has been realized, the double clamp 51 is rotated, in particular rotated back, by its rotary drive 65 in such a way that the part of the edge 48 of the piece of laundry 20 held stretched between the clamping jaws 52 runs horizontally. The piece of laundry 20 is now ready to be raised to the side onto the feed conveyor 11.

Figure 13:
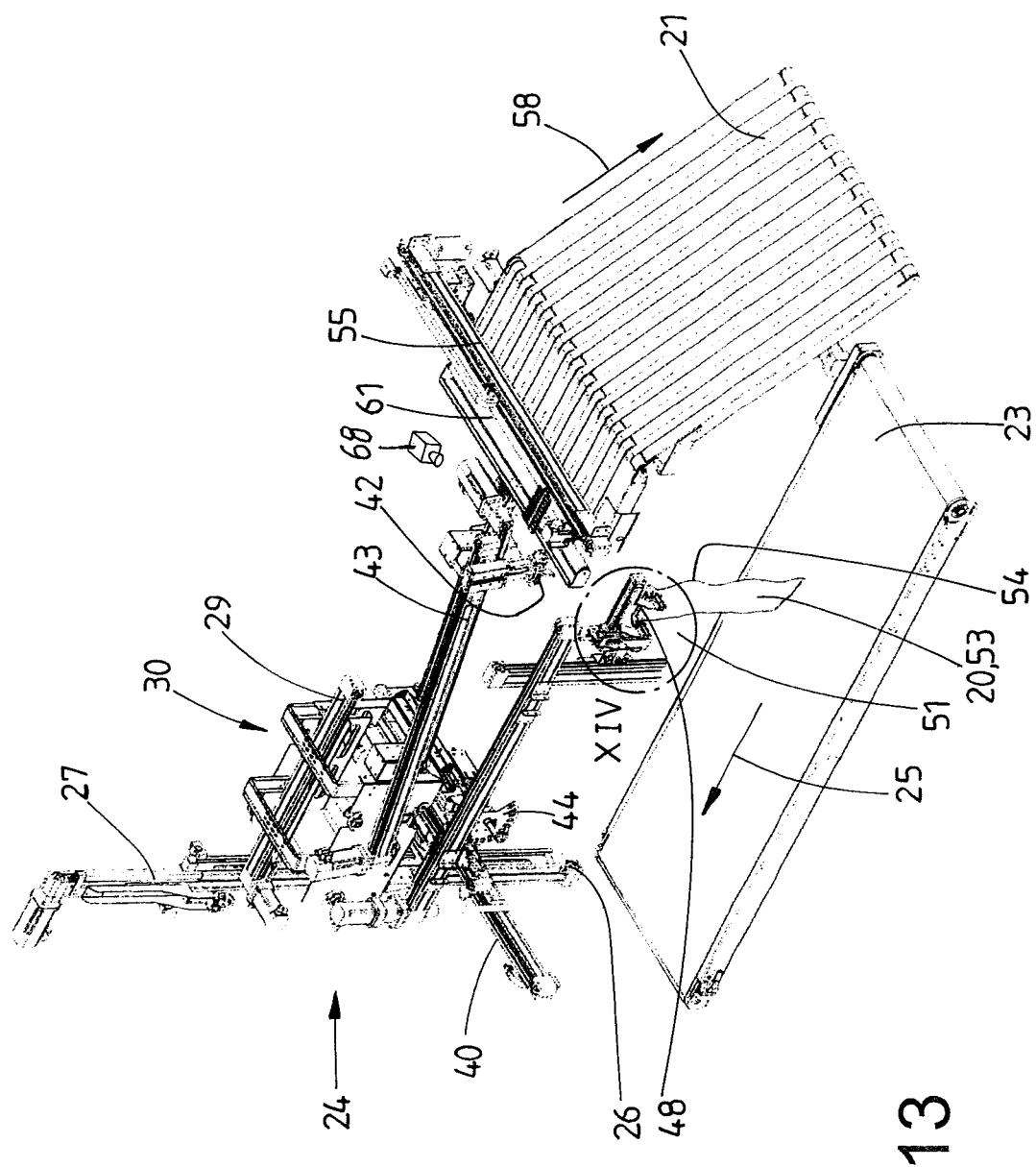
FIG. 13 shows a perspective view of the device analogous to FIG. 2 with the piece of laundry held in the double clamp.
Figure 14:
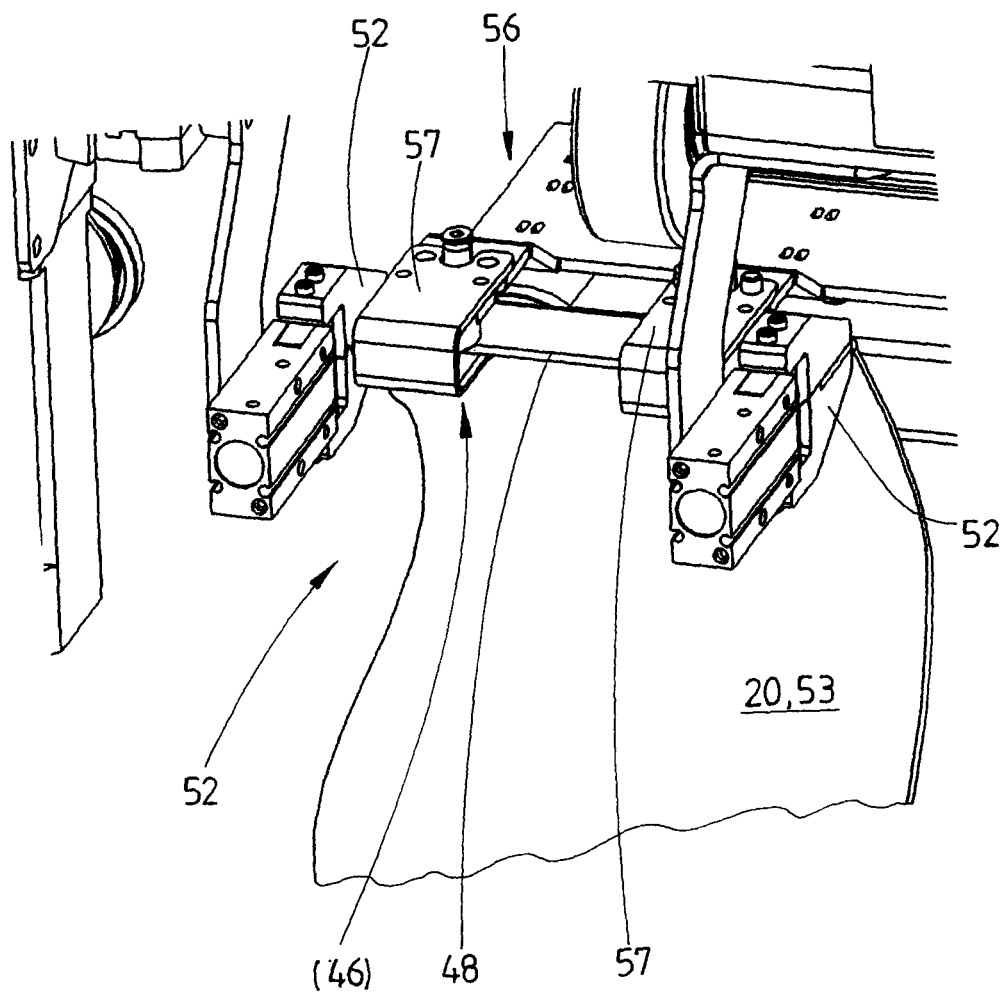
FIG. 14 shows a detail XIV from FIG. 13 for transferring part of the piece of laundry from the double clamp to a raising clamp.

Finally, the piece of laundry 20 with the edge strip 53 and the front edge 54 leading in the conveying direction or feed direction 58 of the feed conveyor 21 is raised transversely onto the feed conveyor 21. To this end, the start of the feed conveyor 21 has assigned thereto a raising clamp 56 which is movable back and forth transversely over said feed conveyor by a shuttle cylinder 55 or another linear drive (FIGS. 13 and 14). The raising clamp 56 is also realized as a double clamp with two spaced-apart, identical clamping jaws 57. The distance between the outsides of the two clamping jaws 57 is somewhat smaller than the clearance distance between the clamping jaws 52 of the double clamp 51 which have been moved apart for taking over the piece of laundry 20. In this way, the clamping jaws 57 of the raising clamp 56 can move between the clamping jaws 52 of the double clamp 51 and, in this case, can take over the part of the edge 48 of the piece of laundry 20 held stretched out between the clamping jaws 52 of the double clamp 51 and also hold it in a stretched manner.

The piece of laundry 20 raised onto the feed conveyor 21 transversely to the feed direction 58 with its front edge strip 53 moves with the front edge 54 leading in the feed direction 58 onto the front end region of the feed conveyor 21, onto the upper run of the adjacent narrow conveyor belt of the feed conveyor 21.

The feed conveyor 21 has assigned thereto an aligning apparatus. This serves the purpose of monitoring the front edge strip 53 of the piece of laundry 20, in particular the front edge 54, when the piece of laundry 20 is raised onto the feed conveyor 21 and, where applicable, controlling and correcting it such that the front edge 54 of the piece of laundry 20 extends, at least at the end of the raising operation, at right angles to the feed direction 58 of the feed conveyor 21, namely of its longitudinal center axis.

The aligning apparatus has at least one apparatus for capturing the contour of at least part of an edge or an edging of the piece of laundry 20, for example a light strip or sensor strip, multiple two-dimensional cameras 66, 67 or a three-dimensional camera 68, a control unit and a guide roll 59 or also at least one aligning belt. When the edge strip 53 of the piece of laundry 20 is raised in a transverse manner onto the feed conveyor 21, the at least one apparatus determines at least the contour of the entire or only part of the front edge 54 of the edge strip 53 as a result of contactless optical scanning or scanning or also by images. The apparatus determines, in particular, whether there are any deviations in the front edge 54 in relation to the right-angled contour with respect to the feed direction 58 and how large they are. Accordingly, the guide roll 59 is controlled via the control unit corresponding to the values received by the apparatus, for example image data. To this end, the guide roll 59 is rotatable in a controlled manner about a vertical rotational axis. Apart from this, the guide roll 59 is supported from above on the edge strip 53 of the piece of laundry 20 which is to be raised transversely onto the feed conveyor 21 such that the point of the piece of laundry 20 situated between the guide roll 59 and the feed conveyor 21 is clamped as it were between the guide roll 59 and the upper run of the feed conveyor.

When the edge strip 53 of the piece of laundry 20 is raised transversely onto the feed conveyor 21, the guide roll 59 is normally aligned such that its horizontal rotational axis 60 extends parallel to the feed direction 58 of the feed conveyor 21. In this case, the vertical rotational axis is initially still freely rotatable about its vertical rotational axis as long as the front edge 54 of the piece of laundry 20 does not need to be aligned when it is raised onto the feed conveyor 21.

The control unit does not rotate the guide roll 59 about its vertical rotational axis until the at least one apparatus determines a deviation in the raising of the front edge 54 of the piece of laundry 20 onto the feed conveyor 21 in a right-angled manner, it being possible for a very small rotation to suffice. The alignment of the front edge 54 of the edge strip 53 of the piece of laundry 20 to the feed direction 58 of the feed conveyor 21 is corrected as a result of this. Said correction is effected in a controlled or regulated way in such a manner that deviations from the desired right-angled contour of the front edge 54 of the piece of laundry 20 to the feed direction 58 of the feed conveyor 21 are balanced out or compensated for in dependence on the data received from the at least one apparatus.

An alternative aligning apparatus that is not shown in the figures is also conceivable where, instead of the guide roll 59, at least one narrow aligning belt which is drivable in a circulatory manner is provided. When the edge strip 53 of the piece of laundry 20 is raised onto the feed conveyor 21, the edge strip 53 is pulled transversely over the upper run of the at least one aligning belt. As a result of the orientation of the edge strip determined by the previously described apparatus, in particular of its free edge, or of the front edge 54 of the piece of laundry 20 to the feed direction 58 of the feed conveyor 21, at least one aligning belt is driven by the control unit in such a manner, in particular the upper run is driven in the feed direction 58 or in opposition to the feed direction and, in this case, the piece of laundry 20, above all the edge strip 53, is aligned with the front edge 54 of the piece of laundry 20 at right angles to the feed direction 58.

Figure 15:
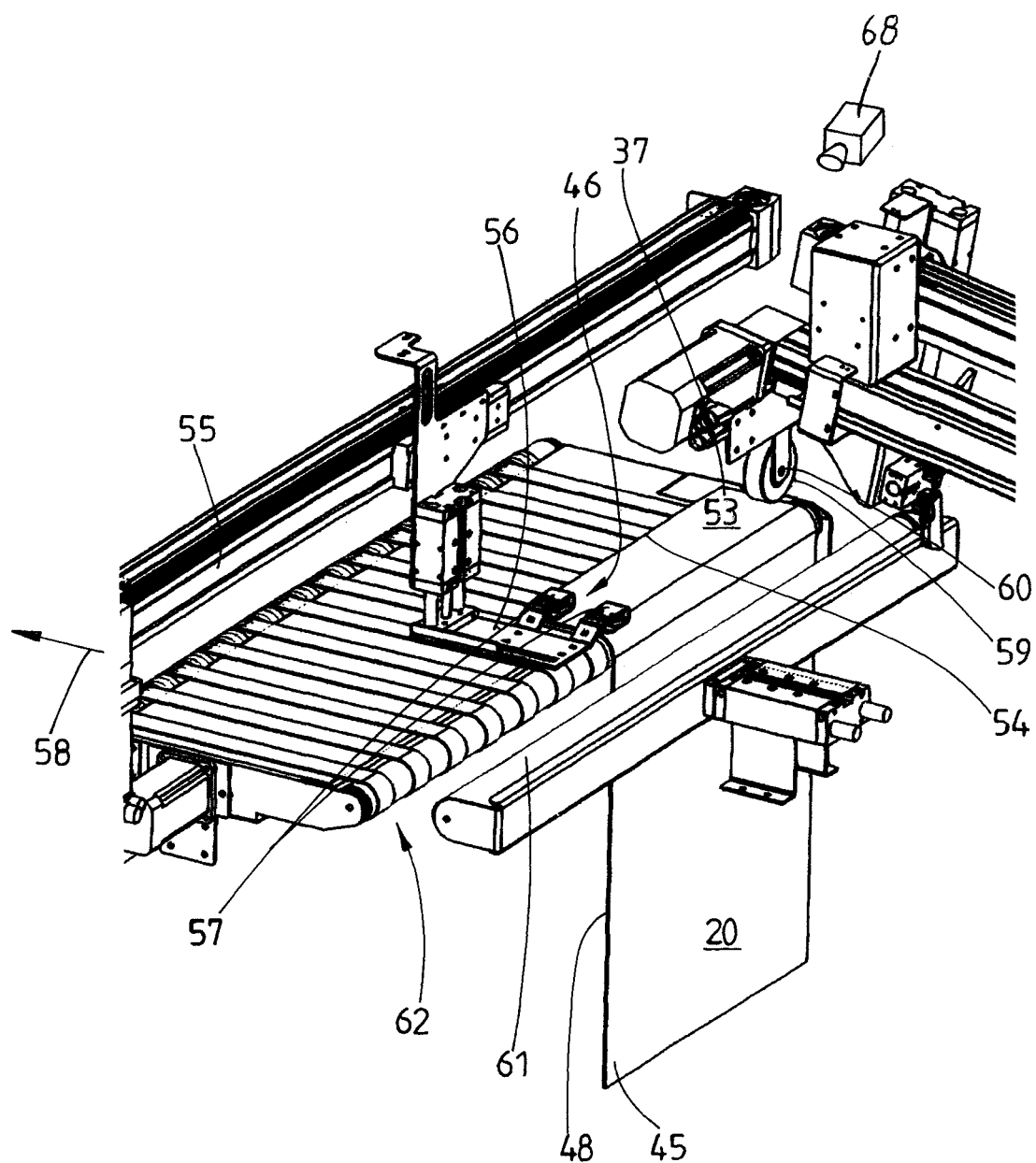
FIG. 15 shows a perspective representation of the device in the region of the feed conveyor with the piece of laundry raised onto the same.

Once the edge strip 53 of the piece of laundry 20 has been raised in an aligned manner onto the feed conveyor 21, a pressure roll 61, which is continuous preferably over the entire operating width of the feed conveyor 21, is moved against a front guide end 62 of the feed conveyor 21, as a result of which the piece of laundry 20 is held between the front guide end 62 of the feed conveyor 21 and the pressure roll 61. This prevents the piece of laundry 20 raised onto the feed conveyor 21 with the front narrow edge strip 23 slipping off the feed conveyor 21 on account of not enough friction on the belts of the same. Once a sufficiently large part of the piece of laundry 20 arrives on the feed conveyor 21, the pressure roll 61 is moved back into its starting point again for raising a following piece of laundry 20 (FIG. 15).

It is also conceivable not to raise the edge strip 53 of the respective piece of laundry 20 directly onto the feed conveyor 21. Instead of this, the edge strip 53 can be raised lengthways on at least one raising conveyor which is arranged preferably transversely over a starting portion of the feed conveyor 21. In a preferred manner, an upper run of a conveyor belt, which is drivable in a circulatory manner, of the raising conveyor can be acted upon with negative pressure for sucking-in parts of the edge strip 53 of the piece of laundry 20. The edge strip 23, aligned perpendicularly to the feed direction 58 of the feed conveyor 21 in the manner described previously, is raised onto the raising conveyor and is fixed temporarily on the upper run of the same by negative pressure. The edge strip 43 is then deposited on the feed conveyor 21 aligned at right angles as a result of moving the raising conveyor transversely in the feed direction 58 of the feed conveyor 21.

The method described above in conjunction with the explanation of the device is distinguished as a result of essential operations for isolating and feeding pieces of laundry 20 to a feed conveyor 21, which transports the pieces of laundry 20 to a mangle, a folding machine or another laundry subsequent handling apparatus, being accompanied, in particular observed, by at least one imaging apparatus 66, 67, 68 or an apparatus having the same effect.

Each imaging apparatus 66, 67, 68 assigned to an isolating apparatus 24 determines the piece of laundry 20 that can be most favorably removed from the pile of laundry and also the point at which the gripper 26 of the isolating apparatus 24 can best grip the piece of laundry 20 which is to be isolated next and where possible remove it individually from the pile of laundry.

At least one further imaging apparatus 66, 67, 68 can detect the position of the freely downwardly hanging corner 46 of the piece of laundry 20 held stretched out at diagonally opposite corners 37 and 45 and the position and alignment of at least the edge 48 of the piece of laundry 20 adjoining the freely hanging corner 46. The image data received from the at least one imaging apparatus 66, 67, 68 is transmitted to a control unit and is evaluated by said control unit such that the clamping jaws 52 of the double clamp 51 are aligned parallel to the edge 48 and the piece of laundry 20 can be gripped at said edge 48 close to the corner 46.

Further imaging apparatuses can be provided at different points of the device, for example where other points, in particular corners, of the piece of laundry 20 are to be determined and/or operations to transfer the piece of laundry 20, preferably to a clamp or from one clamp to another, are effected.

LIST OF REFERENCES

20 Piece of laundry
21 Feed conveyor
22 Frame
23 Belt conveyor
24 Isolating apparatus
25 Transport direction
26 Gripper
27 Shuttle cylinder
28 Clamp
29 Shuttle cylinder
30 Re-isolating apparatus
31 Belt drive
32 Belt drive
33 Upper run
34 Run portion
35 Gap
36 Throughput direction
37 Rear corner
38 Guide drum
39 Light grid
40 Shuttle cylinder
41 Transverse-grip clamp
42 Clamp
43 Shuttle cylinder
44 Tensioning apparatus
45 Corner
46 Lower corner
47 Edge
48 Edge
49 Shuttle cylinder
50 Clamp
51 Double clamp
52 Clamping jaw
53 Edge strip
54 Front edge
55 Shuttle cylinder
56 Rising clamp
57 Clamping jaw
58 Feed direction
59 Guide roll
60 Rotational axis
61 Pressure roll
62 Guide end
63 Short shuttle cylinder
64 Rotary drive
65 Rotary drive
66 Imaging apparatus
67 imaging apparatus
68 three-dimensional camera

What is claimed is:

1. A method for feeding pieces of laundry (20) from a pile of laundry to a subsequent laundry mangle or a laundry folding machine, the method comprising:
    detecting, using a first imaging apparatus, an arbitrary point on at least one of the pieces of laundry (20) to grip the at least one piece of laundry (20);
    gripping the at least one piece of laundry (20) at the arbitrary point detected by the first imaging apparatus and pulling the at least one piece of laundry (20) out of the pile of laundry;
    detecting a corner (46) of the at least one piece of laundry (20) and the direction of an edge (48) of the at least one piece of laundry (20) starting from the corner (46) using a second imaging apparatus;
    moving a double clamp (51) comprising two clamping jaws (52) toward an end area of the edge (48) of the at least one piece of laundry (20) starting from the corner (46);
    clamping at least part of the edge (48) of the at least one piece of laundry (20) in the two clamping jaws (52), wherein the two clamping jaws (52) grip a lateral section of the edge (48) of the at least one piece of laundry (20) starting from the corner (46) and wherein the at least one piece of laundry (20) hangs down freely from the two clamping jaws (52) whereby an edge strip (53) of the at least one piece of laundry (20) is realized under the two clamping jaws (52); and
    raising or depositing the at least one piece of laundry (20) and pulling the at least one piece of laundry (20) by the edge strip (53) by the two clamping jaws (52) onto a feed conveyor (21), transversely to a feed direction (58) of the piece of laundry (20) and aligned at least with the part of the edge (48) of the piece of laundry (20), onto the feed conveyor (21) using data determined by a third imaging apparatus.

2. The method as claimed in claim 1, wherein a gripper (26) for the gripping of the at least one piece of laundry (20) from the pile of laundry and the pile of laundry are movable relative to one another at least in three axes, wherein the pile of laundry is movable along one axis and the gripper (26) is movable along at least two axes.

3. The method as claimed in claim 2, further comprising feeding the at least one piece of laundry (20) removed from the pile of laundry to a re-isolating apparatus (30).

4. The method as claimed in claim 3, further comprising detecting and gripping a rearmost point of the at least one piece of laundry (20) in the re-isolating apparatus in the event that multiple pieces of laundry (20) have been removed from the pile of laundry at the same time by the gripper (26).

5. The method as claimed in claim 1, further comprising stretching the at least one piece of laundry (20) for realizing the corner (46) of the at least one piece of laundry which hangs down freely.

6. The method as claimed in claim 5, wherein the isolated piece of laundry (20) is stretched at opposite corners (37, 45) for realizing the corner (46) of the at least one piece of laundry which hangs down freely.

7. The method as claimed in claim 5, further comprising detecting the corner (46) of the at least one piece of laundry (20) which hangs down by the second imaging apparatus and aligning the first of the two clamping jaws (52) with respect to the corner (46) and moving the first of the two clamping jaws (52) to the corner (46) for gripping the at least one piece of laundry (20) at the corner (46).

8. The method as claimed in claim 5, further comprising detecting the edge (48) of the at least one piece of laundry (20) which proceeds from the corner (46) of the at least one piece of laundry (20) that hangs down freely by the second imaging apparatus and aligning the first of the two clamping jaws (52) with respect to the edge (48) and moving the first of the two clamping jaws (52) to the edge (48) for gripping the at least one piece of laundry (20) at the edge (48).

9. The method as claimed in claim 8, wherein the double clamp (51) is aligned to the contour of the edge (48) of the at least one piece of laundry (20) determined by the second imaging apparatus before the double clamp (51) grips the at least one piece of laundry (20) at the edge (48).

10. The method as claimed in claim 9, wherein the edge (48) of the at least one piece of laundry (20) is held by the two clamping jaws (52) of the double clamp (51) at two spaced-apart points.

11. The method as claimed in claim 10, wherein the double clamp (51) holds the gripped part of the edge (48) of the at least one piece of laundry (20) in a stretched manner between the two spaced-apart points.

12. The method as claimed in claim 10, further comprising depositing the at least one piece of laundry (20) transversely onto the feed conveyor (21) and, for depositing the at least one piece of laundry (20) onto the feed conveyor (21), increasing the distance between the two spaced-apart points at which the double clamp (51) holds the at least one piece of laundry (20).

13. The method as claimed in claim 12, further comprising depositing the at least one piece of laundry (20) from one side transversely to the transport direction of the feed conveyor (21) onto the feed conveyor (21), with the part of the edge (48) held by the double clamp (51) being deposited at the front on the feed conveyor (21).

14. The method as claimed in claim 13, further comprising depositing a front edge strip (53) of the at least one piece of laundry (20) from one side transversely to transport direction of the feed conveyor (21) at the front on the feed conveyor (21) with the part of the edge (48) held by the double clamp (51) which corresponds in width to the part of the edge (48) of the at least one piece of laundry (20) held by the double clamp (51).

15. The method as claimed in claim 14, further comprising using the third imaging apparatus to capture data regarding the raising of the front edge strip (53) of the at least one piece of laundry (20) with regard to a right-angled contour of the edge strip (53) relative to the feed direction (58) of the feed conveyor (21), and controlling an aligning apparatus for bringing about the right-angled raising of front edge strip (53) of the at least one piece of laundry (20) onto the feed conveyor (21) by way of the data obtained by the third imaging apparatus.

16. A device for isolating pieces of laundry (20) to be fed to a laundry mangle or a laundry folding machine, comprising:

a conveyor for conveying a pile of laundry of multiple pieces of laundry (20) to an isolating apparatus (24), the isolating apparatus (24) having a gripper (26) for gripping at least one piece of laundry (20) from the pile of laundry, the conveyor being a belt conveyor (23);

at least one clamp following the isolating apparatus (24) for raising an edge strip (53) of the at least one piece of laundry (20) onto a feed conveyor (21) of the or upstream of the laundry mangle or the laundry folding machine, and a first imaging apparatus assigned to the conveyor and to the isolating apparatus (24) assigned to the conveyor (23), wherein the gripper (26) of the isolating apparatus (24) is movable along two axes and the pile of laundry is movable by the conveyor (23) along a third axis in or in opposition to the transport direction (25) by a drive of the belt conveyor (23).

17. The device as claimed in claim 16, further comprising a re-isolating apparatus (30) arranged downstream of the isolating apparatus (24) for the subsequent isolating of multiple pieces of laundry (20) gripped at the same time by the gripper (26) of the isolating apparatus (24).

18. The device as claimed in claim 17, further comprising a double clamp (51) comprising two clamping jaws (52) for stretching the at least one piece of laundry (20) at two spaced-apart points for realizing a corner (46) of the at least one piece of laundry (20) which hangs down freely and a second imaging apparatus being provided for determining at least the position of the corner (46) of the at least one piece of laundry (20) which hangs down freely.

19. The device as claimed in claim 16, further comprising a clamp which holds part of an edge (48) of the edge strip (53) of the at least one piece of laundry (20) and the clamp is movable from one side of the conveyor transversely to the feed direction (58) of the at least one piece of laundry (20) to the laundry mangle or the laundry folding machine over the conveyor.

20. A device for feeding pieces of laundry (20) to a laundry mangle or a laundry folding machine, comprising:

at least one conveyor for feeding at least one piece of laundry (20) to the laundry mangle or laundry folding machine;

a first clamp for raising at least one edge strip (53) of the at least one piece of laundry (20) onto the at least one conveyor, and a second clamp which holds part of an edge (48) of the edge strip (53) of the at least one piece of laundry (20), wherein the second clamp is movable from one side of the at least one conveyor transversely to a feed direction (58) of the at least one piece of laundry (20) to the laundry mangle or the laundry folding machine over the at least one conveyor, whereby the second clamp clamps the part of the edge (48) of the edge strip (53) of the at least one piece of laundry (20) in the two clamping jaws (52), wherein the two clamping jaws (52) grip a lateral section of the edge (48) of the at least one piece of laundry (20) starting from a lower corner (46) of the at least one piece of laundry (20) and wherein the at least one piece of laundry (20) hangs down from the two clamping jaws (52) whereby the edge strip (53) of the at least one piece of laundry (20) is realized under the two clamping jaws (52), and whereby the two clamping jaws (52) pull the at least one piece of laundry (20) by the edge strip (53) onto the conveyor, transversely to the feed direction (58) of the at least one piece of laundry (20) and aligned at least with the part of the edge (48) of the piece of laundry (20).

21. The device as claimed in claim 20, further comprising:
at least one imaging apparatus for monitoring the raising of the front edge strip (53) of the at least one piece of laundry (20) onto the at least one conveyor as a result of observing an angle of a front edge (54) of the at least one piece of laundry (20) with respect to the feed direction (58) of the at least one conveyor; and
an aligning apparatus, which is controlled by data from the at least one imaging apparatus, provided for the correction of the angle of the front edge (54), wherein the aligning apparatus comprises a controllable guide device which supports at least the front edge (54) of the at least one piece of laundry (20) which lies on the at least one conveyor.

22. A method for feeding pieces of laundry (20) to a subsequent laundry mangle or a laundry folding machine, the method comprising:
determining a point to grip the at least one piece of laundry (20) using a first imaging apparatus for monitoring of the at least one piece of laundry (20), the first imaging apparatus capturing data related to an image of the at least one piece of laundry (20) and forwarding the data related to the image of the at least one piece of laundry (20) to a control unit for determining movement paths of a gripper for gripping the at least one piece of laundry (20);
gripping the at least one piece of laundry (20) at the determined point with the gripper and pulling the at least one piece of laundry (20) out of the pile of laundry;
detecting a corner (46) of the at least one piece of laundry (20) and the direction of an edge (48) of the at least one piece of laundry (20) starting from the corner (46) using a second imaging apparatus;
moving a double clamp (51) comprising two clamping jaws (52) toward an end area of the edge (48) of the at least one piece of laundry (20) starting from the corner (46);
clamping at least part of the edge (48) of the at least one piece of laundry (20) in the two clamping jaws (52), wherein the two clamping jaws (52) grip a lateral section of the edge (48) of the at least one piece of laundry (20) starting from the corner (46) and wherein the at least one piece of laundry (20) hangs down freely from the two clamping jaws (52) whereby an edge strip (53) of the at least one piece of laundry (20) is realized under the two clamping jaws (52); and
raising or depositing the at least one piece of laundry (20) and pulling the at least one piece of laundry (20) by the edge strip (53) by the two clamping jaws (52) onto a feed conveyor (21), transversely to a feed direction (58) of the piece of laundry (20) and aligned at least with the part of the edge (48) of the piece of laundry (20), onto the feed conveyor (21) using data determined by a third imaging apparatus.

23. The method as claimed in claim 22, wherein a gripper (26) for the gripping of the at least one piece of laundry (20) from the pile of laundry and the pile of laundry are movable relative to one another at least in three axes, wherein the pile of laundry is movable along one axis and the gripper (26) is movable along at least two axes.

24. The method as claimed in claim 23, further comprising feeding the at least one piece of laundry (20) removed from the pile of laundry to a re-isolating apparatus (30).

25. The method as claimed in claim 22, further comprising detecting the corner (46) of the at least one piece of laundry (20) which hangs down freely by the second imaging apparatus and aligning the first of the two clamping jaws (52) with respect to the corner (46) and moving the first of the two clamping jaws (52) to the corner (46) for gripping the at least one piece of laundry (20) at the corner (46).

26. The method as claimed in claim 22, further comprising detecting the edge (48) of the at least one piece of laundry (20) which proceeds from the corner (46) of the at least one piece of laundry (20) which hangs down freely by the second imaging apparatus and aligning the first of the two clamping jaws (52) with respect to the edge (48) and moving the first of the two clamping jaws (52) to the edge (48) for gripping the at least one piece of laundry (20) at the edge (48).

27. The method as claimed in claim 22, further comprising depositing the at least one piece of laundry (20) transversely onto the feed conveyor (21) and, for depositing the at least one piece of laundry (20) onto the feed conveyor (21), increasing the distance between the two spaced-apart points at which the double clamp (51) holds the at least one piece of laundry (20).

* * * * *

UNITED STATES PATENT AND TRADEMARK OFFICE
CERTIFICATE OF CORRECTION

PATENT NO. : 11,339,526 B2
APPLICATION NO. : 16/300974
DATED : May 24, 2022
INVENTOR(S) : Wilhelm Bringewatt et al.

It is certified that error appears in the above-identified patent and that said Letters Patent is hereby corrected as shown below:

On the Title Page

(30) Foreign Application Priority Data Should read:
Oct. 14, 2016 (DE) .................... 102016012274.9
May 31, 2016 (DE) .................... 102016006413.7

Signed and Sealed this
Twenty-eighth Day of February, 2023

Katherine Kelly Vidal
*Director of the United States Patent and Trademark Office*